US012720610B2

(12) United States Patent
Liu et al.

(10) Patent No.: US 12,720,610 B2
(45) Date of Patent: Aug. 25, 2026

(54) MOBILE-TERMINATED DOWNLINK DATA TRANSMISSION AND SUBSEQUENT MOBILE-ORIGINATED UPLINK DATA TRANSMISSION WITHOUT ENTERING CONNECTED MODE

(71) Applicant: QUALCOMM Incorporated, San Diego, CA (US)

(72) Inventors: Huichun Liu, Beijing (CN); Gavin Bernard Horn, La Jolla, CA (US); Miguel Griot, La Jolla, CA (US); Peng Cheng, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 852 days.

(21) Appl. No.: 17/597,754

(22) PCT Filed: Aug. 20, 2019

(86) PCT No.: PCT/CN2019/101487
§ 371 (c)(1),
(2) Date: Jan. 21, 2022

(87) PCT Pub. No.: WO2021/031098
PCT Pub. Date: Feb. 25, 2021

(65) Prior Publication Data

US 2022/0272767 A1 Aug. 25, 2022

(51) Int. Cl.
*H04W 74/00* (2009.01)
*H04W 24/08* (2009.01)
(Continued)

(52) U.S. Cl.
CPC ....... *H04W 74/0841* (2013.01); *H04W 24/08* (2013.01); *H04W 72/0446* (2013.01);
(Continued)

(58) Field of Classification Search
CPC ............. H04W 74/0841; H04W 24/08; H04W 72/0446; H04W 74/004; H04W 74/0866;
(Continued)

(56) References Cited

U.S. PATENT DOCUMENTS 12,082,267 B2 * 9/2024 Fujishiro ........... H04W 74/0833
12,219,648 B2 * 2/2025 Xu ........................ H04W 76/10
(Continued)

FOREIGN PATENT DOCUMENTS

WO 2013009068 A2 1/2013

OTHER PUBLICATIONS

Sierra Wireless: "DL following UL EDT", R2-1815077, 3GPP TSG RAN WG2 Meeting #103bis, 3rd Generation Partnership Project (GPP), vol. RAN WG1, No. Chenggdu, China, Oct. 8, 2018-Oct. 12, 2018, Sep. 28, 2018, XP0515244 (Year: 2018).*
(Continued)

*Primary Examiner* — Thinh D Tran
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive radio resource control (RRC) signaling indicating a duration for a timer to be used during a random access channel (RACH) procedure in which the UE transmits mobile-originated uplink data. While in an inactive mode, the UE may transmit the mobile-originated uplink data in a first message of the RACH procedure and the UE may start the timer based at least in part on transmitting the uplink data. The UE may monitor, while in the inactive mode and for the duration of the timer indicated in the RRC signaling, to detect a second message of the RACH proce-
(Continued)

dure including mobile-terminated downlink data in response to the mobile-originated uplink data. Numerous other aspects are provided.

30 Claims, 13 Drawing Sheets

(51) Int. Cl.

*H04W 72/0446* (2023.01)
*H04W 74/08* (2009.01)
*H04W 74/0833* (2024.01)
*H04W 76/30* (2018.01)
*H04W 74/0836* (2024.01)
*H04W 74/0838* (2024.01)

(52) U.S. Cl.

CPC ..... *H04W 74/004* (2013.01); *H04W 74/0833* (2013.01); *H04W 74/0866* (2013.01); *H04W 76/30* (2018.02); *H04W 74/0836* (2024.01); *H04W 74/0838* (2024.01)

(58) Field of Classification Search

CPC ............. H04W 76/30; H04W 74/0833; H04W 74/0836; H04W 74/0838; H04L 1/188; H04L 2001/0097

See application file for complete search history.

(56) References Cited

U.S. PATENT DOCUMENTS

| | | | | |
|---|---|---|---|---|
| 2011/0292854 | A1 | 12/2011 | Terry et al. | |
| 2013/0188473 | A1 | 7/2013 | Dinan | |
| 2019/0082335 | A1 | 3/2019 | Yu et al. | |
| 2019/0253881 | A1* | 8/2019 | Gage | H04W 12/03 |
| 2019/0261188 | A1* | 8/2019 | Wieczorek | H04W 16/14 |
| 2020/0045593 | A1* | 2/2020 | Jung | H04W 24/10 |
| 2020/0214070 | A1* | 7/2020 | Ingale | H04W 12/106 |
| 2020/0252823 | A1* | 8/2020 | Kim | H04W 48/16 |
| 2021/0168895 | A1* | 6/2021 | Sha | H04W 52/0235 |
| 2021/0274556 | A1* | 9/2021 | Park | H04L 1/0026 |
| 2022/0039098 | A1* | 2/2022 | Chang | H04W 76/20 |
| 2022/0078872 | A1* | 3/2022 | Shrestha | H04W 68/12 |
| 2022/0124594 | A1* | 4/2022 | Wang | H04W 60/04 |
| 2022/0279395 | A1* | 9/2022 | Zirwas | H04W 36/00692 |

OTHER PUBLICATIONS

ZTE Corporation: "Further Consideration on UL Aspects of D-PUR in IDLE", 3GPP TSG-RAN2 meeting#105, R2-1901477, 3rd Generation Partnership Project (3GPP), Sophia-Antipolis Cedex, France, No. Feb. 25-Mar. 1, 2019, 11 Pages, XP05160283 (Year: 2019).*

Shrestha et al., "Operation of EMTC and NB-IOT UES When Connected to 5GCN", U.S. Appl. No. 62/796,487, filed Jan. 24, 2019. (Year: 2019).*

Institute for Information Industry (III): "The Impact of BWP Configuration and Switching", R2-1800778, 3GPP TSG-RAN WG2 NR Ad hoc 1801, Vancouver, Canada, Jan. 22-26, 2018 (Jan. 26, 2018), 5 pages.

International Search Report and Written Opinion—PCT/CN2019/101487—ISA/EPO—May 20, 2020.

Rapporteur (Qualcomm Incorporated): "Running CR for NR-based Access to Unlicensed Spectrum", R2-1905236, 3GPP TSG-RAN WG2 Meeting #105bis, Xian, China, Apr. 8-12, 2019 (Apr. 12, 2019), 7 pages.

Huawei: "Support of MO EDT in CP and UP Solutions", 3GPP TSG-RAN3 Meeting #103bis, R3-191259, MO EDT Supporting, 3rd Generation Partnership Project (3GPP), Mobile Competence Centre, 650, Route Des Lucioles, F-06921 Sophia-Antipolis Cedex, France, vol. RAN WG3, No. Xi'an, China, Apr. 8-12, 2019, Apr. 6, 2019, XP051702539, 3 Pages, section 2.2.

Sierra Wireless: "DL following UL EDT", R2-1815077, 3GPP TSG RAN WG2 Meeting #103bis, 3rd Generation Partnership Project (3GPP), Mobile Competence Centre, 650, Route Des Lucioles, F-06921 Sophia-Antipolis Cedex, France, vol. RAN WG1, No. Chenggdu, China, Oct. 8, 2018-Oct. 12, 2018, Sep. 28, 2018, XP051524444, 2 Pages, sections 1 and 2.

Supplementary European Search Report—EP19942009—Search Authority—The Hague—Apr. 11, 2023.

ZTE Corporation: "Further Consideration on UL Aspects of D-PUR in IDLE", 3GPP TSG-RAN2 meeting#105, R2-1901477, 3rd Generation Partnership Project (3GPP), Mobile Competence Centre, 650, Route Des Lucioles, F-06921 Sophia-Antipolis Cedex, France, No. Feb. 25-Mar. 1, 2019, 11 Pages, XP051602835, Section 2.1-2.5.

ZTE: "Options comparison for MT EDT", 3GPP TSG-RAN2 meeting#104, R2-1816884, Options Comparison for MT EDT, 3rd Generation Partnership Project (3GPP), Mobile Competence Centre, 650, Route Des Lucioles, F-06921 Sophia-Antipolis Cedex, France, vol. RAN WG2, No. Spokane, United States, Nov. 12-16, 2018, Nov. 12, 2018, XP051556447, 10 Pages, section 2.1, section 2.2.2.

Neul Ltd: "Timer-Based Connection Release", 3GPP TSG-RAN WG2 #92, R2-156504 Timer-Based Connection Release V1, 3rd Generation Partnership Project (3GPP), Mobile Competence Centre, 650, Route Des Lucioles, F-06921 Sophia-Antipolis Cedex, France, vol. RAN WG2. No. Anaheim, USA, Nov. 16, 2015-Nov. 20, 2015, Nov. 16, 2015 (Nov. 16, 2015), XP051005907, 3 Pages, the whole document.

European Search Report—EP26152801—Search Authority—The Hague—Mar. 31, 2026.

Interdigital Communications: "UL and DL Data Transmission Procedures in Inactive State", 3GPP Draft, 3GPP TSG-RAN WG2 NR AdHoc, R2-1700235, 3rd Generation Partnership Project, Mobile Competence Centre, 650, Route Des Lucioles, F-06921 Sophia-Antipolis Cedex, France, vol. Ran WG2, No. Spokane, WA, Jan. 17, 2017-Jan. 19, 2017, Jan. 7, 2017, pp. 1-4, XP051203939, sections 1 to 2.3.

* cited by examiner

900

MOBILE-TERMINATED DOWNLINK DATA TRANSMISSION AND SUBSEQUENT MOBILE-ORIGINATED UPLINK DATA TRANSMISSION WITHOUT ENTERING CONNECTED MODE

CROSS-REFERENCE TO RELATED APPLICATION

This application is a 371 national stage of Patent Cooperation Treaty (PCT) Application No. PCT/CN2019/101487 filed on Aug. 20, 2019, entitled "MOBILE-TERMINATED DOWNLINK DATA TRANSMISSION AND SUBSEQUENT MOBILE-ORIGINATED UPLINK DATA TRANSMISSION WITHOUT ENTERING CONNECTED MODE," which is hereby expressly incorporated by reference herein.

FIELD OF THE DISCLOSURE

Aspects of the present disclosure generally relate to wireless communication and to techniques and apparatuses for mobile-terminated downlink data transmission and subsequent mobile-originated uplink data transmission without entering connected mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include: receiving radio resource control (RRC) signaling indicating a duration for a timer to be used during a random access channel (RACH) procedure in which the UE transmits mobile-originated uplink data; transmitting, while in an inactive mode, the mobile-originated uplink data in a first message of the RACH procedure; starting the timer based at least in part on transmitting the mobile-originated uplink data; and monitoring, while in the inactive mode and for the duration of the timer indicated in the RRC signaling, to detect a second message of the RACH procedure including mobile-terminated downlink data in response to the mobile-originated uplink data.

In some aspects, a method of wireless communication, performed by a UE, may include: transmitting mobile-originated uplink data in a first message of a RACH procedure while the UE is in an inactive mode; receiving, in a second message of the RACH procedure, information related to a UE-specific search space (USS) that the UE is to monitor for mobile-terminated downlink data transmitted to the UE in response to the mobile-originated uplink data, wherein the second message includes an RRC release message causing the UE to remain in the inactive mode; and monitoring the USS for the mobile-terminated downlink data for a configured time period while remaining in the inactive mode.

In some aspects, a method of wireless communication, performed by a UE, may include: receiving, in a message releasing the UE to an idle mode or an inactive mode, information related to a USS that the UE is to monitor for mobile-terminated downlink data and information related to a radio network temporary identifier (RNTI) to which the mobile-terminated downlink data is to be addressed; entering the idle mode or the inactive mode in response to the message; and monitoring the USS for mobile-terminated downlink data addressed to the RNTI for a configured time period while in the idle mode or the inactive mode.

In some aspects, a method of wireless communication, performed by a base station, may include: configuring a UE with a duration for a timer to be used during a RACH procedure in which the UE transmits mobile-originated uplink data while operating in an inactive mode; receiving, from the UE while operating in the inactive mode, the mobile-originated uplink data in a first message of the RACH procedure; receiving, from an anchor base station in communication with one or more core network devices, mobile-terminated downlink data in response to the mobile-originated uplink data; and transmitting, to the UE operating in the inactive mode, the mobile-terminated downlink data in a second message of the RACH procedure prior to expiration of the timer, wherein the mobile-terminated downlink data is multiplexed with an RRC release message causing the UE to remain in the inactive mode.

In some aspects, a method of wireless communication, performed by a base station, may include: receiving, from a UE, mobile-originated uplink data in a first message of a RACH procedure while the UE is in an inactive mode; and transmitting, in a second message of the RACH procedure, information related to a USS that the UE is to monitor for mobile-terminated downlink data transmitted to the UE in response to the mobile-originated uplink data, wherein the second message includes an RRC release message causing the UE to remain in the inactive mode.

In some aspects, a method of wireless communication, performed by a base station, may include: transmitting, to a UE, a message releasing the UE to an idle mode or an inactive mode, wherein the message includes information related to a USS that the UE is to monitor for mobile-terminated downlink data and information related to an RNTI to which the mobile-terminated downlink data is to be addressed; and transmitting, within the USS, mobile-terminated downlink data addressed to the RNTI within a configured time period and while the UE is in the idle mode or the inactive mode.

In some aspects, a UE for wireless communication may include a memory and one or more processors coupled with the memory. The memory and the one or more processors may be configured to: receive RRC signaling indicating a duration for a timer to be used during a RACH procedure in which the UE transmits mobile-originated uplink data; transmit, while in an inactive mode, the mobile-originated uplink data in a first message of the RACH procedure; start the timer based at least in part on transmitting the mobile-originated uplink data; and monitor, while in the inactive mode and for the duration of the timer indicated in the RRC signaling, to detect a second message of the RACH procedure including mobile-terminated downlink data in response to the mobile-originated uplink data.

In some aspects, a UE for wireless communication may include a memory and one or more processors coupled with the memory. The memory and the one or more processors may be configured to: transmit mobile-originated uplink data in a first message of a RACH procedure while the UE is in an inactive mode; receive, in a second message of the RACH procedure, information related to a USS that the UE is to monitor for mobile-terminated downlink data transmitted to the UE in response to the mobile-originated uplink data, wherein the second message includes an RRC release message causing the UE to remain in the inactive mode; and monitor the USS for the mobile-terminated downlink data for a configured time period while remaining in the inactive mode.

In some aspects, a UE for wireless communication may include a memory and one or more processors coupled with the memory. The memory and the one or more processors may be configured to: receive, in a message releasing the UE to an idle mode or an inactive mode, information related to a USS that the UE is to monitor for mobile-terminated downlink data and information related to an RNTI to which the mobile-terminated downlink data is to be addressed; enter the idle mode or the inactive mode in response to the message; and monitor the USS for mobile-terminated downlink data addressed to the RNTI for a configured time period while in the idle mode or the inactive mode.

In some aspects, a base station for wireless communication may include a memory and one or more processors coupled with the memory. The memory and the one or more processors may be configured to: configure a UE with a duration for a timer to be used during a RACH procedure in which the UE transmits mobile-originated uplink data while operating in an inactive mode; receive, from the UE while operating in the inactive mode, the mobile-originated uplink data in a first message of the RACH procedure; receive, from an anchor base station in communication with one or more core network devices, mobile-terminated downlink data in response to the mobile-originated uplink data; and transmit, to the UE operating in the inactive mode, the mobile-terminated downlink data in a second message of the RACH procedure prior to expiration of the timer, wherein the mobile-terminated downlink data is multiplexed with an RRC release message causing the UE to remain in the inactive mode.

In some aspects, a base station for wireless communication may include a memory and one or more processors coupled with the memory. The memory and the one or more processors may be configured to: receive, from a UE, mobile-originated uplink data in a first message of a RACH procedure while the UE is in an inactive mode; and transmit, in a second message of the RACH procedure, information related to a USS that the UE is to monitor for mobile-terminated downlink data transmitted to the UE in response to the mobile-originated uplink data, wherein the second message includes an RRC release message causing the UE to remain in the inactive mode.

In some aspects, a base station for wireless communication may include a memory and one or more processors coupled with the memory. The memory and the one or more processors may be configured to: transmit, to a UE, a message releasing the UE to an idle mode or an inactive mode, wherein the message includes information related to a USS that the UE is to monitor for mobile-terminated downlink data and information related to an RNTI to which the mobile-terminated downlink data is to be addressed; and transmit, within the USS, mobile-terminated downlink data addressed to the RNTI within a configured time period and while the UE is in the idle mode or the inactive mode.

In some aspects, a non-transitory computer-readable medium may store one or more instructions for wireless communication. The one or more instructions, when executed by one or more processors of a base station, may cause the one or more processors to: receive RRC signaling indicating a duration for a timer to be used during a RACH procedure in which the UE transmits mobile-originated uplink data; transmit, while in an inactive mode, the mobile-originated uplink data in a first message of the RACH procedure; start the timer based at least in part on transmitting the mobile-originated uplink data; and monitor, while in the inactive mode and for the duration of the timer indicated in the RRC signaling, to detect a second message of the RACH procedure including mobile-terminated downlink data in response to the mobile-originated uplink data.

In some aspects, a non-transitory computer-readable medium may store one or more instructions for wireless communication. The one or more instructions, when executed by one or more processors of a base station, may cause the one or more processors to: transmit mobile-originated uplink data in a first message of a RACH procedure while the UE is in an inactive mode; receive, in a second message of the RACH procedure, information related to a USS that the UE is to monitor for mobile-terminated downlink data transmitted to the UE in response to the mobile-originated uplink data, wherein the second message includes an RRC release message causing the UE to remain in the inactive mode; and monitor the USS for the mobile-terminated downlink data for a configured time period while remaining in the inactive mode.

In some aspects, a non-transitory computer-readable medium may store one or more instructions for wireless communication. The one or more instructions, when executed by one or more processors of a base station, may cause the one or more processors to: receive, in a message releasing the UE to an idle mode or an inactive mode, information related to a USS that the UE is to monitor for mobile-terminated downlink data and information related to an RNTI to which the mobile-terminated downlink data is to be addressed; enter the idle mode or the inactive mode in response to the message; and monitor the USS for mobile-terminated downlink data addressed to the RNTI for a configured time period while in the idle mode or the inactive mode.

In some aspects, a non-transitory computer-readable medium may store one or more instructions for wireless communication. The one or more instructions, when executed by one or more processors of a base station, may cause the one or more processors to: configure a UE with a duration for a timer to be used during a RACH procedure in which the UE transmits mobile-originated uplink data while operating in an inactive mode; receive, from the UE while operating in the inactive mode, the mobile-originated uplink data in a first message of the RACH procedure; receive, from an anchor base station in communication with one or more core network devices, mobile-terminated downlink data in response to the mobile-originated uplink data; and transmit, to the UE operating in the inactive mode, the mobile-terminated downlink data in a second message of the RACH procedure prior to expiration of the timer, wherein the mobile-terminated downlink data is multiplexed with an RRC release message causing the UE to remain in the inactive mode.

In some aspects, a non-transitory computer-readable medium may store one or more instructions for wireless communication. The one or more instructions, when executed by one or more processors of a base station, may cause the one or more processors to: receive, from a UE, mobile-originated uplink data in a first message of a RACH procedure while the UE is in an inactive mode; and transmit, in a second message of the RACH procedure, information related to a USS that the UE is to monitor for mobile-terminated downlink data transmitted to the UE in response to the mobile-originated uplink data, wherein the second message includes an RRC release message causing the UE to remain in the inactive mode.

In some aspects, a non-transitory computer-readable medium may store one or more instructions for wireless communication. The one or more instructions, when executed by one or more processors of a base station, may cause the one or more processors to: transmit, to a UE, a message releasing the UE to an idle mode or an inactive mode, wherein the message includes information related to a USS that the UE is to monitor for mobile-terminated downlink data and information related to an RNTI to which the mobile-terminated downlink data is to be addressed; and transmit, within the USS, mobile-terminated downlink data addressed to the RNTI within a configured time period and while the UE is in the idle mode or the inactive mode.

In some aspects, an apparatus for wireless communication may include means for receiving RRC signaling indicating a duration for a timer to be used during a RACH procedure in which the apparatus transmits mobile-originated uplink data; means for transmitting, while in an inactive mode, the mobile-originated uplink data in a first message of the RACH procedure; means for starting the timer based at least in part on transmitting the mobile-originated uplink data; and means for monitoring, while in the inactive mode and for the duration of the timer indicated in the RRC signaling, to detect a second message of the RACH procedure including mobile-terminated downlink data in response to the mobile-originated uplink data.

In some aspects, an apparatus for wireless communication may include means for transmitting mobile-originated uplink data in a first message of a RACH procedure while the apparatus is in an inactive mode; means for receiving, in a second message of the RACH procedure, information related to a USS that the apparatus is to monitor for mobile-terminated downlink data transmitted to the apparatus in response to the mobile-originated uplink data, wherein the second message includes an RRC release message causing the apparatus to remain in the inactive mode; and means for monitoring the USS for the mobile-terminated downlink data for a configured time period while remaining in the inactive mode.

In some aspects, an apparatus for wireless communication may include means for receiving, in a message releasing the apparatus to an idle mode or an inactive mode, information related to a USS that the apparatus is to monitor for mobile-terminated downlink data and information related to an RNTI to which the mobile-terminated downlink data is to be addressed; means for entering the idle mode or the inactive mode in response to the message; and means for monitoring the USS for mobile-terminated downlink data addressed to the RNTI for a configured time period while in the idle mode or the inactive mode.

In some aspects, an apparatus for wireless communication may include means for configuring a UE with a duration for a timer to be used during a RACH procedure in which the UE transmits mobile-originated uplink data while operating in an inactive mode; means for receiving, from the UE while operating in the inactive mode, the mobile-originated uplink data in a first message of the RACH procedure; means for receiving, from an anchor base station in communication with one or more core network devices, mobile-terminated downlink data in response to the mobile-originated uplink data; and means for transmitting, to the UE operating in the inactive mode, the mobile-terminated downlink data in a second message of the RACH procedure prior to expiration of the timer, wherein the mobile-terminated downlink data is multiplexed with an RRC release message causing the UE to remain in the inactive mode.

In some aspects, an apparatus for wireless communication may include means for receiving, from a UE, mobile-originated uplink data in a first message of a RACH procedure while the UE is in an inactive mode; and means for transmitting, in a second message of the RACH procedure, information related to a USS that the UE is to monitor for mobile-terminated downlink data transmitted to the UE in response to the mobile-originated uplink data, wherein the second message includes an RRC release message causing the UE to remain in the inactive mode.

In some aspects, an apparatus for wireless communication may include means for transmitting, to a UE, a message releasing the UE to an idle mode or an inactive mode, wherein the message includes information related to a USS that the UE is to monitor for mobile-terminated downlink data and information related to an RNTI to which the mobile-terminated downlink data is to be addressed; and means for transmitting, within the USS, mobile-terminated downlink data addressed to the RNTI within a configured time period and while the UE is in the idle mode or the inactive mode.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
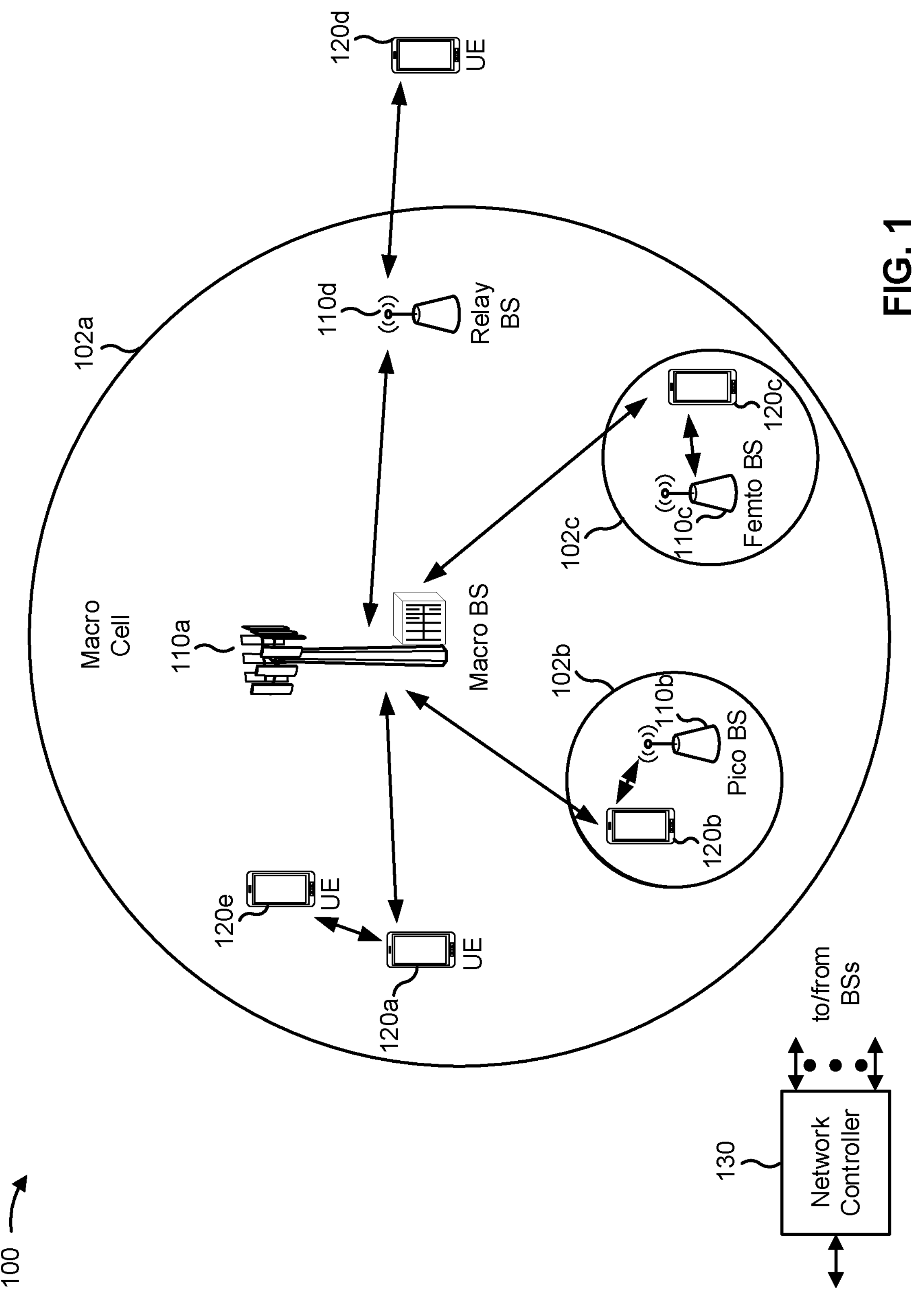
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
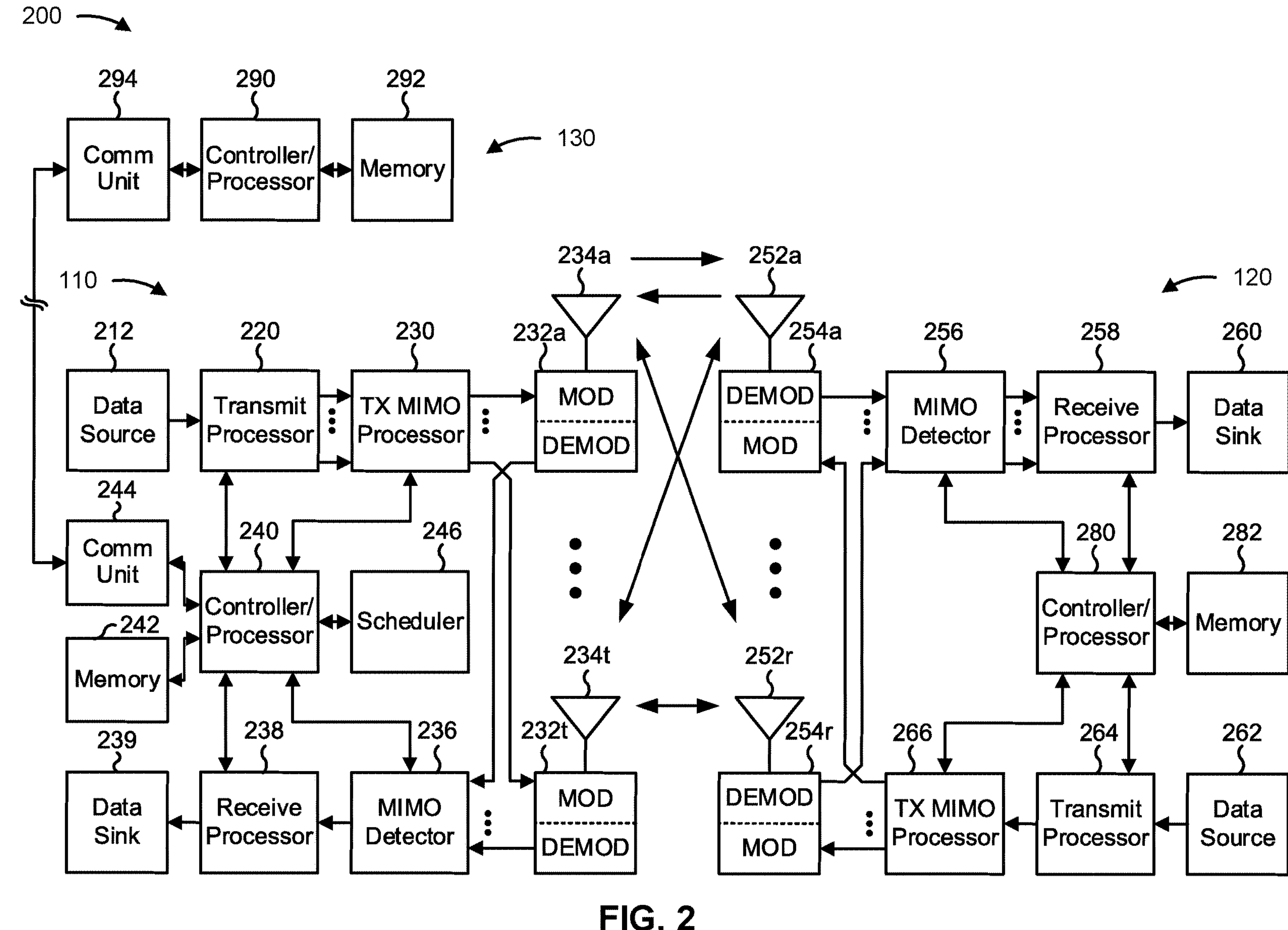
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with mobile-terminated downlink data transmission and subsequent mobile-originated uplink data transmission without entering connected mode, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 800 of FIG. 8, process 900 of FIG. 9, process 1000 of FIG. 10, process 1100 of FIG. 11, process 1200 of FIG. 12, process 1300 of FIG. 13, and/or other processes as described herein. A scheduler 246 may schedule UEs for data transmission on the downlink and/or uplink.

In some aspects, UE 120 may include means for receiving radio resource control (RRC) signaling indicating a duration for a timer to be used during a random access channel (RACH) procedure in which UE 120 transmits mobile-originated uplink data, means for transmitting, while in an inactive mode, the mobile-originated uplink data in a first message of the RACH procedure, means for starting the timer based at least in part on transmitting the mobile-originated uplink data, means for monitoring, while in the inactive mode and for the duration of the timer indicated in the RRC signaling, to detect a second message of the RACH procedure including mobile-terminated downlink data in response to the mobile-originated uplink data, and/or the like. Additionally, or alternatively, in some aspects, UE 120 may include means for transmitting mobile-originated uplink data in a first message of a RACH procedure while UE 120 is in an inactive mode, means for receiving, in a second message of the RACH procedure, information related to a UE-specific search space (USS) that UE 120 is to monitor for mobile-terminated downlink data transmitted to UE 120 in response to the mobile-originated uplink data, wherein the second message includes an RRC release message causing UE 120 to remain in the inactive mode, means for monitoring the USS for the mobile-terminated downlink data for a configured time period while remaining in the inactive mode, and/or the like. Additionally, or alternatively, in some aspects, UE 120 may include means for receiving, in a message releasing UE 120 to an idle mode or an inactive mode, information related to a USS that UE 120 is to monitor for mobile-terminated downlink data and information related to a radio network temporary identifier (RNTI) to which the mobile-terminated downlink data is to be addressed, means for entering the idle mode or the inactive mode in response to the message, means for monitoring the USS for mobile-terminated downlink data addressed to the RNTI for a configured time period while in the idle mode or the inactive mode, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring UE 120 with a duration for a timer to be used during a RACH procedure in which UE 120 transmits mobile-originated uplink data while operating in an inactive mode, means for receiving, from UE 120 while operating in the inactive mode, the mobile-originated uplink data in a first message of the RACH procedure, means for receiving, from an anchor base station in communication with one or more core network devices, mobile-terminated downlink data in response to the mobile-originated uplink data, means for transmitting, to UE 120 operating in the inactive mode, the mobile-terminated downlink data in a second message of the RACH procedure prior to expiration of the timer, wherein the mobile-terminated downlink data is multiplexed with an RRC release message causing UE 120 to remain in the inactive mode, and/or the like. Additionally, or alternatively, base station 110 may include means for receiving, from UE 120, mobile-originated uplink data in a first message of a RACH procedure while UE 120 is in an inactive mode, means for transmitting, in a second message of the RACH procedure, information related to a USS that UE 120 is to monitor for mobile-terminated downlink data transmitted to UE 120 in response to the mobile-originated uplink data, wherein the second message includes an RRC release message causing UE 120 to remain in the inactive mode, and/or the like. Additionally, or alternatively, base station 110 may include means for transmitting, to UE 120, a message releasing UE 120 to an idle mode or an inactive mode, wherein the message includes information related to a USS that UE 120 is to monitor for mobile-terminated downlink data and information related to an RNTI to which the mobile-terminated downlink data is to be addressed, means for transmitting, within the USS, mobile-terminated downlink data addressed to the RNTI within a configured time period and while UE 120 is in the idle mode or the inactive mode, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

In some cases, a UE may be communicating in a data session in which only a small amount of data is generated in a given burst. For example, instant messaging applications often include data payloads with relatively small sizes to carry a small amount of text, low-resolution images, and/or the like. In another example, social media applications may generate notifications, updates, and/or the like that have a relatively small payload size. In still further examples, wearable devices may be used to exchange position information, small and/or low-resolution images, short voice and/or video clips, and/or the like; various applications may transmit keep-alive packets that have a small size in order to maintain a session context; and wireless sensors may transmit packets to communicate information related to changes in temperature, pressure, and/or the like. In some cases, when these small data payloads are generated, the UE may be operating in a low-power mode, such as an idle mode or an inactive mode. In addition to reducing battery consumption at the UE, the low-power mode may be associated with reduced signaling between the UE and a wireless network. However, in some cases, the UE may have to transition out of the low-power mode and into a connected mode in order to transmit and/or receive data, even if the payload size is relatively small, which can lead to increased power consumption, additional network overhead, and/or the like.

Some aspects described herein provide techniques and apparatuses for enabling a UE to receive a small mobile-terminated downlink data transmission responsive to a mobile-originated uplink data transmission without causing the UE to enter a connected mode (e.g., while the UE is operating in an inactive mode, an idle mode, and/or the like). For example, in some aspects, the small uplink data transmission may generally have a payload size that satisfies a threshold value (e.g., a maximum size such as a few kilobytes, one megabyte, a few megabytes, and/or the like), which may be configured in system information that is communicated to UEs in unicast, broadcast, multicast, and/or other suitable RRC signaling, and/or the like. Furthermore, some aspects described herein provide techniques and apparatuses for enabling a UE to transmit a subsequent mobile-originated uplink data transmission responsive to the mobile-terminated downlink data transmission without entering the connected mode. For example, in some aspects, the UE may transmit mobile-originated uplink data to a serving base station as part of a random access channel (RACH) procedure (e.g., in Message A of a two-step RACH procedure, in Message 3 of a four-step RACH procedure, and/or the like), and the serving base station may forward the mobile-originated uplink data to one or more core network devices (e.g., a User Plane Function (UPF) device) via an anchor base station. In some aspects, the one or more core network devices may return, to the serving base station via the anchor base station, mobile-terminated downlink data responsive to the mobile-originated uplink data. Accordingly, to handle a potential delay whereby the mobile-terminated downlink data may not be available at the serving base station at a time when a next message of the RACH procedure (e.g., Message B of the two-step RACH procedure, Message 4 of the four-step RACH procedure, and/or the like) is to be transmitted to the UE, some aspects described herein may configure one or more timers to enable the UE to receive the mobile-terminated downlink data later than the time when the next message of the RACH procedure is to be transmitted to the UE.

For example, in some aspects, radio resource control (RRC) signaling may be used to indicate an extended duration for a timer that the UE is to start after the UE transmits the mobile-originated uplink data as part of the RACH procedure. In this way, the serving base station may receive the mobile-terminated downlink data prior to expiration of the extended duration for the timer, and the UE may monitor to detect the mobile-terminated downlink data in the next message of the RACH according to the extended duration for the timer associated with the RACH procedure. Furthermore, in addition to including the mobile-terminated downlink data, the next message of the RACH procedure may include a release message that causes the UE to remain in the inactive mode or the idle mode. Additionally, or alternatively, in some aspects, the serving base station may transmit the next message of the RACH procedure to the UE while awaiting the mobile-terminated downlink data to be received from the one or more core network devices, and the next message of the RACH procedure may include information related to a UE-specific search space (USS) that the UE is to monitor for the mobile-terminated downlink data. In this case, the UE may monitor the USS for the mobile-terminated downlink data after receiving the next message of the RACH procedure, which may similarly include a release message that causes the UE to remain in the inactive mode or the idle mode. Additionally, or alternatively, in some aspects, the USS that the UE is to monitor for the mobile-terminated downlink data may be indicated in RRC signaling initially releasing the UE to the inactive mode or the idle mode, which may enable the UE to monitor for the mobile-terminated downlink data independent from any RACH procedure, and regardless of whether the UE previously transmitted mobile-originated uplink data.

Furthermore, to enable the UE to transmit subsequent mobile-originated uplink data responsive to the mobile-terminated downlink data, some aspects described herein may provide the UE with a dedicated preconfigured uplink resource (DPUR) configuration to enable the UE to transmit the mobile-originated uplink data while the UE is in the idle mode, the inactive mode, and/or the like. For example, in some aspects, the DPUR may include a dedicated random access channel (RACH) preamble, a dedicated physical uplink shared channel (PUSCH), and/or another suitable uplink resource that is allocated to the UE to enable the UE to transmit the mobile-originated uplink data from the idle mode or the inactive mode. For example, when the UE is configured with a DPUR that includes a dedicated RACH preamble, a UE operating in the idle or inactive mode may initiate a contention-free uplink data transmission in Message 3 of a contention-free four-step RACH procedure. Additionally, or alternatively, when the UE is configured with a DPUR that includes a dedicated RACH preamble and a dedicated PUSCH, a UE operating in the idle or inactive mode may initiate a contention-free uplink data transmission in Message A of a contention-free two-step RACH procedure. Additionally, or alternatively, when the UE is configured with a DPUR that includes a dedicated PUSCH, a UE operating in the inactive mode may initiate an uplink data transmission independent of any RACH procedure. Furthermore, in some aspects, the RRC signaling used to indicate the DPUR to the UE may further include a small data radio network temporary identifier (SD-RNTI) to be used to scramble the uplink data transmission, to schedule a hybrid automatic repeat request (HARQ) retransmission, to monitor for subsequent downlink traffic (e.g., downlink signaling or subsequent mobile-terminated downlink data transmitted to the UE in response to the mobile-originated uplink data), and/or the like.

In this way, the UE may receive the mobile-terminated downlink data while in the idle mode or the inactive mode, and without transitioning from the idle mode or the inactive mode to a connected mode. This decreases signaling overhead that may otherwise be needed to transmit small amounts of mobile-terminated downlink data to the UE and for the UE to transmit subsequent mobile-originated uplink data, which further conserves networking, processing, and/or memory resources of the UE, the serving base station, and/or other network devices. Moreover, this permits the UE to receive the mobile-terminated downlink data and transmit the mobile-originated uplink data without establishing an active connection with the serving base station, which decreases latency in receiving the mobile-terminated downlink data and transmitting the mobile-originated uplink data. In addition, this reduces a quantity of transitions from the idle mode or inactive mode to the connected mode (and vice versa) to receive small amounts of mobile-terminated downlink data and to transmit small amounts of mobile-originated uplink data that may be communicated in bursts, which may save UE power.

Figure 3:
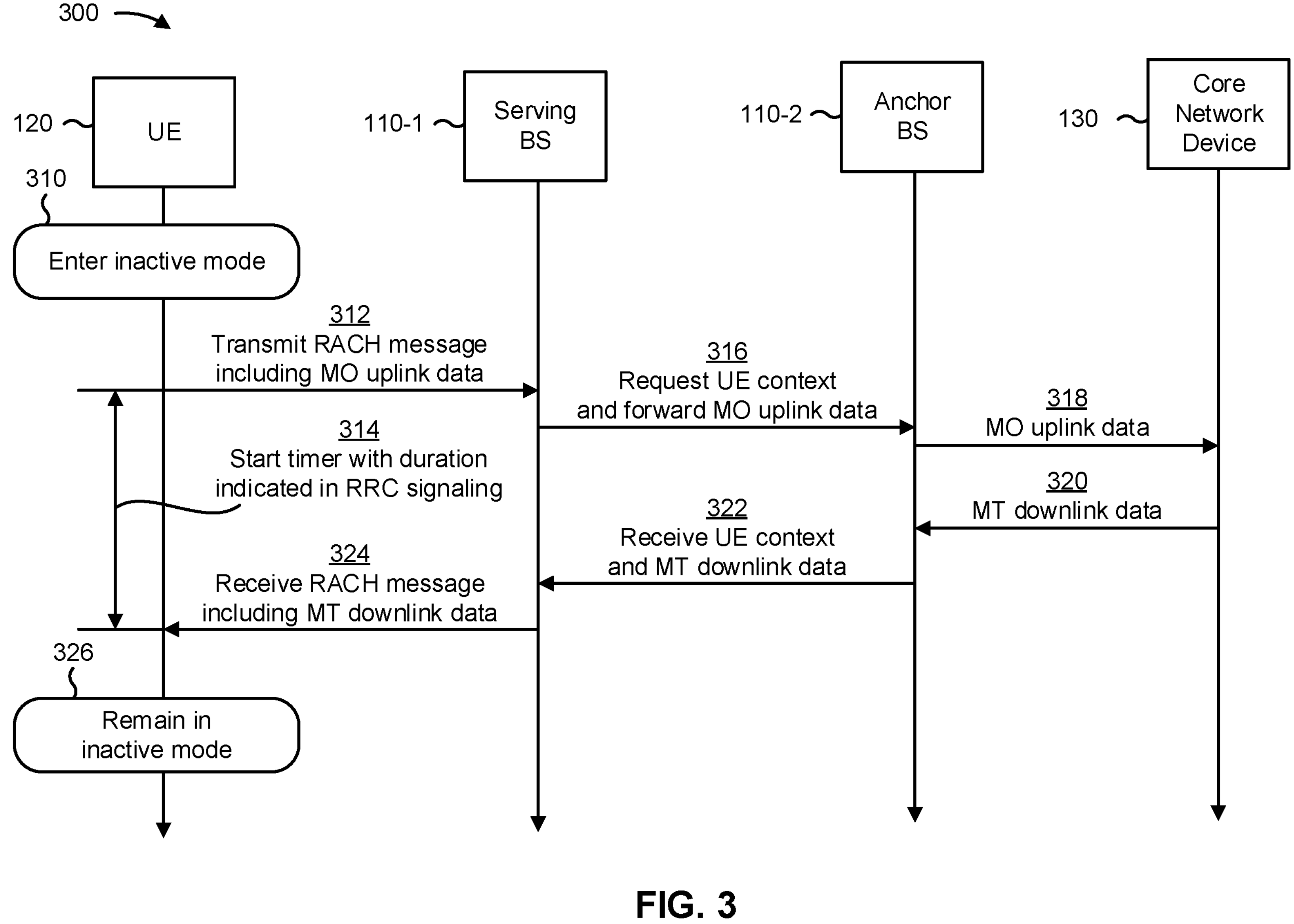
FIGS. 3-4 are diagrams illustrating example call flows enabling mobile-terminated downlink data transmission without causing a UE to enter a connected mode, in accordance with various aspects of the present disclosure.

FIG. 3 is a diagram illustrating an example call flow 300 enabling mobile-terminated downlink data transmission without causing a UE to enter a connected mode, in accordance with various aspects of the present disclosure. As shown in FIG. 3, example call flow 300 may include communication between various components of a wireless network (e.g., wireless network 100), such as a UE 120, a serving base station 110-1, an anchor base station 110-2, and one or more core network devices 130 (e.g., a network controller or another suitable device implementing a UPF), and/or the like. In some aspects, as shown in FIG. 3, and by reference number 310, the UE 120 may be operating in an inactive mode.

For example, in some aspects, the UE 120 may support various communication modes, which may include a connected mode, the inactive mode, an idle mode, and/or another communication mode. While operating in the connected mode (e.g., an RRC connected mode), the UE 120 may be active and communicatively connected (e.g., RRC connected) with the serving base station 110-1. The UE 120 may transition from the connected mode to the inactive mode based at least in part on one or more commands and/or communications received from the serving base station 110-1. For example, in some aspects, the UE may transition from the connected mode to the inactive mode based at least in part on receiving an RRC release message (e.g., an RRCRelease communication with a suspendConfig parameter). In this case, the UE 120, the anchor base station 110-2, the core network device 130, and/or the like may store a context for the UE 120 (e.g., an access stratum (AS) context, a higher-layer configuration, and/or the like), which permits the UE 120 and/or the serving base station 110-1 to obtain the stored context when the UE transmits one or more mobile-originated uplink communications to the serving base station 110-1.

As further shown in FIG. 3, and by reference number 312, the UE 120 may transmit, to the serving base station 110-1, a message associated with a RACH procedure that includes mobile-originated uplink data. For example, in some aspects, transmission of the mobile-originated uplink data may be triggered by an upper layer (e.g., an application layer) generating a small amount of application data (e.g., user plane data having a payload size that satisfies a threshold value, which may be indicated in RRC signaling, one or more SIBs, and/or the like). For example, the small amount of application data may include messaging application data, location data, a small multimedia file, a push notification, a keep-alive packet, sensor data, and/or the like. In some aspects, the message used to transmit the mobile-originated uplink data may correspond to Message A in a two-step RACH procedure, Message 3 in a four-step RACH procedure, and/or the like.

Furthermore, in some aspects, the mobile-originated uplink data may be transmitted based at least in part on a dedicated preconfigured uplink resource (DPUR) that is configured for the UE 120 and indicated to the UE 120 in RRC signaling releasing the UE 120 to the inactive mode. For example, the DPUR may include a dedicated RACH preamble that the UE 120 transmits to the serving base station 110-1 in Message 1 of a contention-free four-step RACH procedure, and the serving base station 110-1 may return, to the UE 120, information related to a dedicated PUSCH assigned to the UE 120 in Message 2 of the contention-free four-step RACH procedure. Accordingly, the UE 120 may then use the dedicated PUSCH to transmit the mobile-originated uplink data in Message 3 of the contention-free four-step RACH procedure. Additionally, or alternatively, the DPUR may include a dedicated RACH preamble and a dedicated PUSCH that the UE 120 uses to transmit the mobile-originated uplink data in Message A of a contention-free two-step RACH procedure. Additionally, or alternatively, the DPUR may include a dedicated PUSCH that the UE 120 uses to transmit the mobile-originated uplink data independent from any RACH procedure, or the UE 120 may transmit the mobile-originated uplink data without a DPUR configuration (e.g., as part of a contention-based RACH procedure).

In some aspects, the RACH message that the UE 120 uses to transmit the mobile-originated uplink data may be configured as an RRC resume request message that indicates an identifier associated with the UE 120 (e.g., a resumeID), a resume cause indicating a reason for transmitting the RRC resume request message (e.g., to resume a previous context, request a path switch, and/or the like), a token to authenticate the UE 120 (e.g., a resumeMAC-I security token), and/or the like. Furthermore, in some aspects, the RRC resume request message may include a traffic pattern indication to indicate that the mobile-originated uplink data is a small data transmission and that the UE 120 desires to remain in the inactive mode, refrain from entering a connected mode, and/or the like.

As further shown in FIG. 3, and by reference number 314, the UE 120 may start a timer having a duration that was indicated to the UE 120 in RRC signaling. For example, in some aspects, the UE 120 may receive the RRC signaling indicating the duration timer at or prior to entering into the inactive mode, and the timer duration may indicate how long the UE 120 is to monitor for mobile-terminated downlink data to be transmitted to the UE 120 in response to the mobile-originated uplink data transmitted as part of the RACH procedure. For example, in some cases, the mobile-terminated downlink data may not be available at the serving base station 110-1 at a time that a next message in the RACH procedure (e.g., Message B in a contention-based or contention-free two-step RACH procedure, Message 4 in a contention-based or contention-free four-step RACH procedure, and/or the like) is to be transmitted to the UE 120 due to a latency associated with requesting and receiving a context for the UE 120, forwarding the mobile-originated uplink data to core network device(s) 130 via the anchor base station 110-2, receiving mobile-terminated downlink data from the core network device(s) 130 via the anchor base station 110-2, and/or the like. Accordingly, in some aspects, the duration indicated in the RRC signaling may specify an extended duration for a T319 timer, a T300 timer, a contention resolution timer, and/or the like. In this way, the UE 120 may avoid having to restart the RACH procedure based at least in part on the timer expiring before the mobile-terminated downlink data arrives at the serving base station 110-1, which permits the serving base station 110-1 to delay a response to the previous RACH message used to communicate the mobile-originated uplink data, transmit the response to the previous RACH message and any responsive mobile-terminated downlink data in a single message, and/or the like.

As further shown in FIG. 3, and by reference number 316, the serving base station 110-1 may request a context for the UE 120 from the anchor base station 110-2 and forward the mobile-originated uplink data received from the UE 120 to the anchor base station 110-2. For example, in some aspects, the anchor base station 110-2 may correspond to a base station to which the UE 120 was most recently communicatively connected prior to entering the inactive mode, whereby the context for the UE 120 may be stored at the anchor base station 110-2. Additionally, or alternatively, the context for the UE 120 may be stored at the anchor base station 110-2 based at least in part on the anchor base station 110-2 having a connection to the one or more core network devices 130, such as a UPF device, used to service mobile-originated uplink traffic and mobile-terminated downlink traffic. Accordingly, when requesting the context for the UE 120 from the anchor base station 110-2, the serving base station 110-1 may provide, to the anchor base station 110-2, the identifier associated with the UE 120 to assist in obtaining the context for the UE 120, the token to authenticate the UE 120, the traffic pattern indication to indicate that the UE 120 is to remain in the inactive mode and refrain from entering a connected mode, the mobile-originated uplink data, and/or the like.

As further shown in FIG. 3, and by reference number 318, the anchor base station 110-2 may forward the mobile-originated uplink data to the core network device 130 (e.g., based at least in part on authenticating the token for the UE 120, the context for the UE 120, and/or the like). As further shown in FIG. 3, and by reference numbers 320 and 322, the anchor base station 110-2 may subsequently receive, from the core network device 130, mobile-terminated downlink data responsive to the mobile-originated uplink data transmitted by the UE 120, which the anchor base station 110-2 may return to the serving base station 110-1 together with the requested context for the UE 120 (e.g., in a ciphered form over a backhaul interface, such as an Xn interface and/or the like). Accordingly, as further shown in FIG. 3, and by reference number 324, the serving base station 110-1 may transmit the mobile-terminated downlink data to the UE 120 in a next message of the RACH procedure, which may correspond to Message B in a two-step RACH procedure, Message 4 in a four-step RACH procedure, and/or the like. Furthermore, as shown by reference number 326, the RACH message that includes the mobile-terminated downlink data may be configured to cause the UE 120 to remain in the inactive mode. For example, the RACH message may include the mobile-terminated downlink data multiplexed (e.g., time division multiplexed, frequency division multiplexed, and/or the like) with an RRC release message that includes a suspendConfig indicator to release the UE 120 to the inactive mode.

In this way, the UE 120 may receive the mobile-terminated downlink data responsive to the mobile-originated uplink data while in the inactive mode, and without transitioning from the inactive mode to a connected mode. This decreases signaling overhead that may otherwise be needed to transmit small amounts of mobile-terminated downlink data to the UE 120, which conserves networking, processing, and/or memory resources of the UE 120, the base station(s) 110, and/or the like. Moreover, this permits the UE 120 to receive the mobile-terminated downlink data without establishing a connection (e.g., an RRC connection) with the base station(s) 110, which decreases latency in receiving the mobile-terminated downlink data. In addition, this reduces a quantity of transitions from the inactive mode to the connected mode to receive small amounts of mobile-terminated downlink data that are generated in bursts, which may save power of the UE 120 and/or the like.

As indicated above, FIG. 3 is provided as an example. Other examples may differ from what is described with respect to FIG. 3.

Figure 4:
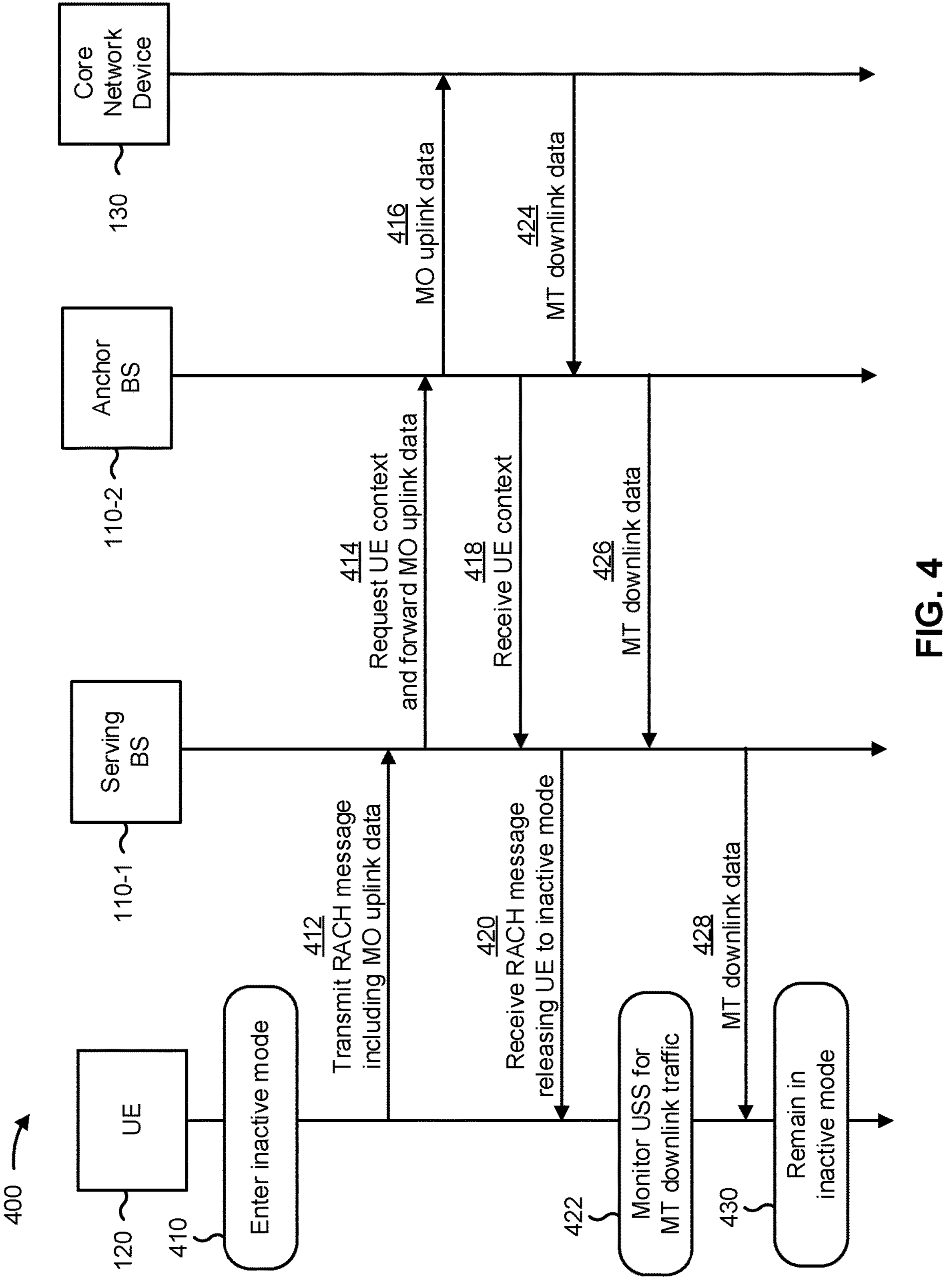

FIG. 4 is a diagram illustrating an example call flow 400 enabling mobile-terminated downlink data transmission without causing a UE to enter a connected mode, in accordance with various aspects of the present disclosure. As shown in FIG. 4, example call flow 400 may include communication between various components of a wireless network (e.g., wireless network 100), such as a UE 120, a serving base station 110-1, an anchor base station 110-2, and one or more core network devices 130 (e.g., a network controller or another suitable device implementing a UPF), and/or the like. In some aspects, as shown in FIG. 4, and by reference number 410, the UE 120 may be operating in an inactive mode.

As further shown in FIG. 4, and by reference number 412, the UE 120 may transmit, to the serving base station 110-1, a message associated with a RACH procedure that includes mobile-originated uplink data. For example, in some aspects, transmission of the mobile-originated uplink data may be triggered by an upper layer generating a small amount of application data (e.g., mobile-originated uplink data having a payload size that satisfies a threshold value). For example, the small amount of application data may include messaging application data, location data, a small multimedia file, a push notification, a keep-alive packet, sensor data, and/or the like. In some aspects, the message used to transmit the mobile-originated uplink data may correspond to Message A in a two-step RACH procedure, Message 3 in a four-step RACH procedure, and/or the like. Furthermore, in some aspects, the mobile-originated uplink data may be transmitted based at least in part on a DPUR that is configured for the UE 120, without a DPUR configuration (e.g., as part of a contention-based RACH procedure), and/or the like.

In some aspects, the RACH message that the UE 120 uses to transmit the mobile-originated uplink data may be configured as an RRC resume request message that indicates an identifier associated with the UE 120 (e.g., a resumeID), a resume cause indicating a reason for transmitting the RRC resume request message (e.g., to resume a previous context, request a path switch, and/or the like), a token to authenticate the UE 120 (e.g., a resumeMAC-I security token), and/or the like. Furthermore, in some aspects, the RRC resume request message may include a traffic pattern indication to indicate that the mobile-originated uplink data is a small data transmission and that the UE 120 desires to remain in the inactive mode, refrain from entering a connected mode, and/or the like.

As further shown in FIG. 4, and by reference number 414, the serving base station 110-1 may request a context for the UE 120 from the anchor base station 110-2 and forward the mobile-originated uplink data received from the UE 120 to the anchor base station 110-2 in a similar manner as described elsewhere herein. For example, when requesting the context for the UE 120 from the anchor base station 110-2, the serving base station 110-1 may provide, to the anchor base station 110-2, the identifier associated with the UE 120 to assist in obtaining the context for the UE 120, the token to authenticate the UE 120, the traffic pattern indication to indicate that the UE 120 is to remain in the inactive mode and refrain from entering a connected mode, the mobile-originated uplink data, and/or the like.

As further shown in FIG. 4, and by reference number 416, the anchor base station 110-2 may forward the mobile-originated uplink data to the core network device 130 (e.g., based at least in part on authenticating the token for the UE 120, the context for the UE 120, and/or the like). As further shown in FIG. 4, and by reference number 418, the serving base station 110-1 may receive, from the anchor base station 110-2, information related to the requested context for the UE 120 (e.g., in a ciphered form over a backhaul interface, such as an Xn interface and/or the like). However, in this case, the serving base station 110-1 receives the information related to the context for the UE 120 without any accompanying mobile-terminated downlink data. Accordingly, as further shown in FIG. 4, and by reference number 420, the serving base station 110-1 may transmit a next message in the RACH procedure to the UE 120 (e.g., Message B in a two-step RACH procedure, Message 4 in a four-step RACH procedure), and/or the like, which may release the UE 120 to the inactive mode. Furthermore, in some aspects, the RACH message releasing the UE 120 to the inactive mode may include information related to one or more dedicated resources to enable the UE 120 to subsequently receive mobile-terminated downlink data. For example, the one or more dedicated resources may include a UE-specific search space (USS) that the UE 120 is to monitor for the mobile-terminated downlink data for a configured time period. Accordingly, as shown by reference number 422, the UE 120 may monitor the USS for the mobile-terminated downlink data for the configured time period. For example, the UE 120 may monitor the USS for an expected downlink assignment for downlink data scheduling, such as an application layer acknowledgement that the previous mobile-originated uplink data was successfully transmitted and received.

As further shown in FIG. 4, and by reference number 424, the anchor base station 110-2 may subsequently receive, from the core network device 130, mobile-terminated downlink data responsive to the mobile-originated uplink data transmitted by the UE 120. As further shown in FIG. 4, and by reference numbers 426 and 428, the anchor base station 110-2 may return the mobile-terminated downlink data to the serving base station 110-1, and the serving base station 110-1 may transmit the mobile-terminated downlink data to the UE 120 within the USS indicated in the message releasing the UE 120 to the inactive mode prior to expiration of the configured time period. Accordingly, as shown by reference number 430, the UE 120 may receive the mobile-terminated downlink data while remaining in the inactive mode and without transitioning from the inactive mode to a connected mode.

In this way, the UE 120 may receive the mobile-terminated downlink data responsive to the mobile-originated uplink data while in the inactive mode, and without transitioning from the inactive mode to a connected mode. This decreases signaling overhead may otherwise be needed to transmit small amounts of mobile-terminated downlink data to the UE 120, which conserves networking, processing, and/or memory resources of the UE 120, the base station(s) 110, and/or the like. Moreover, this permits the UE 120 to receive the mobile-terminated downlink data without establishing a connection (e.g., an RRC connection) with the base station(s) 110, which decreases latency in receiving the mobile-terminated downlink data. In addition, this reduces a quantity of transitions from the inactive mode to the connected mode to receive small amounts of mobile-terminated downlink data that are generated in bursts, which may save power of the UE 120 and/or the like.

As indicated above, FIG. 4 is provided as an example. Other examples may differ from what is described with respect to FIG. 4.

Figure 5:
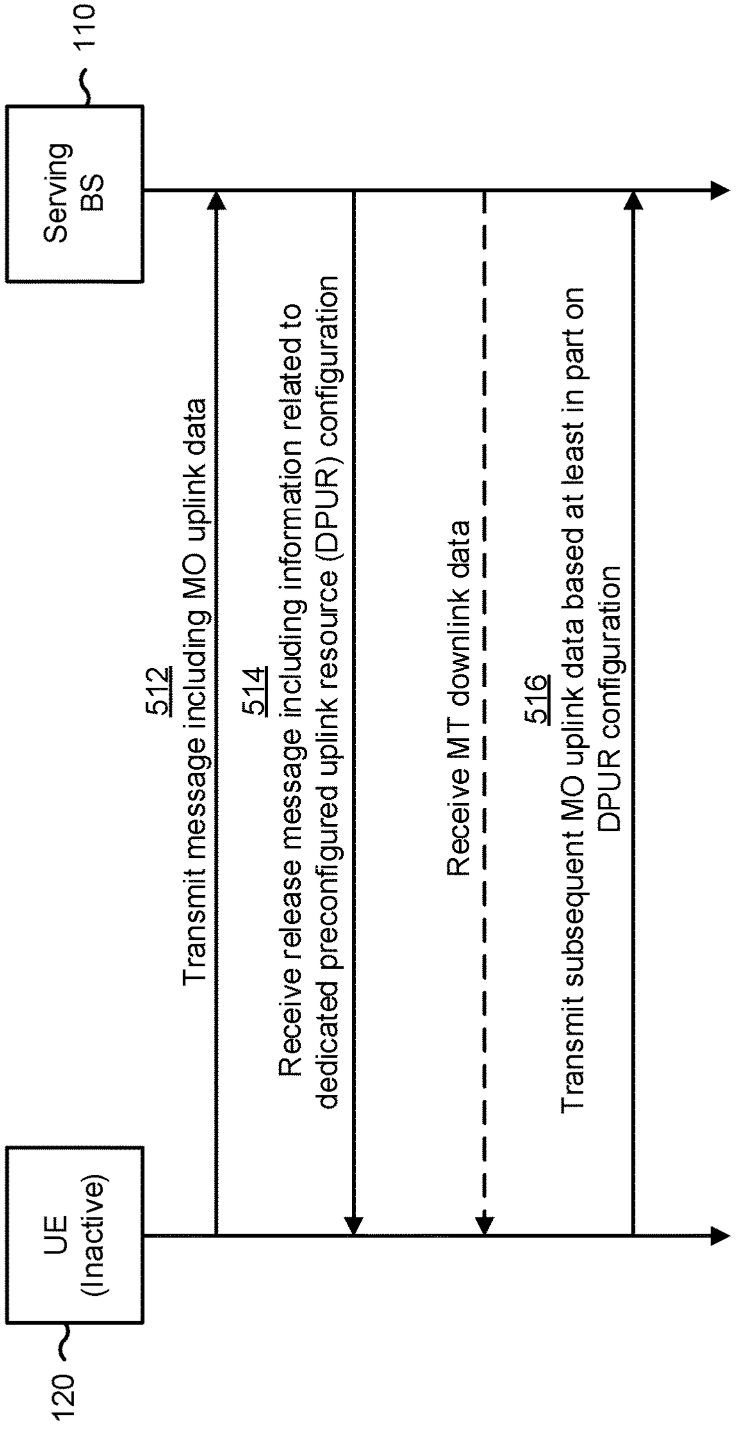
FIGS. 5-7 are diagrams illustrating example call flows enabling mobile-terminated downlink data transmission and subsequent mobile-originated uplink data transmission without causing a UE to enter a connected mode, in accordance with various aspects of the present disclosure.

FIG. 5 is a diagram illustrating an example call flow 500 enabling mobile-terminated downlink data transmission and subsequent mobile-originated uplink data transmission without entering connected mode, in accordance with various aspects of the present disclosure. As shown in FIG. 5, example call flow 500 may include communication between various components of a wireless network (e.g., wireless network 100), such as a UE 120 and a serving base station 110. In some aspects, as shown in FIG. 5, the UE 120 may be operating in an inactive mode.

As shown in FIG. 5, and by reference number 512, the UE 120 may transmit a message including mobile-originated uplink data in a similar manner as described in further detail elsewhere herein. For example, the message including the mobile-originated uplink data may include an RRC resume request message that indicates an identifier associated with the UE 120, a token to enable authentication of the UE 120, a traffic pattern indication to indicate that the mobile-originated uplink data is a small data transmission and that the UE 120 desires to remain in the inactive mode, refrain from entering a connected mode, and/or the like.

As further shown in FIG. 5, and by reference number 514, the UE 120 may receive a release message from the serving base station 110 that includes information related to a DPUR configuration for the UE 120. For example, the DPUR configuration may include a dedicated RACH preamble enabling the UE 120 to initiate a contention-free mobile-originated uplink data transmission from the inactive mode in Message 3 of a contention-free four-step RACH procedure, a dedicated RACH preamble and a dedicated PUSCH enabling the UE 120 to initiate a contention-free mobile-originated uplink data transmission from the inactive mode in Message A of a contention-free two-step RACH procedure, a dedicated PUSCH enabling the UE 120 to initiate a mobile-originated uplink data transmission independent of any RACH procedure, and/or the like. Accordingly, as further shown in FIG. 5, and by reference number 516, the UE 120 may transmit subsequent mobile-originated uplink data based at least in part on the DPUR configuration indicated in the message releasing the UE 120 to the inactive mode. For example, the subsequent mobile-originated uplink data may be generated by an upper layer (e.g., an application layer) and may relate to a messaging application, location data, a small multimedia file, a push notification, a keep-alive packet, sensor data, and/or the like. Additionally, or alternatively, in some aspects, the subsequent mobile-originated uplink data may be responsive to mobile-terminated downlink data that is received while the UE 120 is in the inactive mode, as described elsewhere herein. Furthermore, in some aspects, a dedicated radio network temporary identifier (RNTI) that the UE 120 uses to scramble the initial mobile-originated uplink data may also be used to scramble the subsequent mobile-originated uplink data transmitted based at least in part on the DPUR configuration.

In this way, the UE 120 may receive the mobile-terminated downlink data responsive to the mobile-originated uplink data while in the inactive mode, and without transitioning from the inactive mode to a connected mode. This decreases signaling overhead may otherwise be needed to transmit small amounts of mobile-terminated downlink data to the UE 120 and/or for the UE 120 to transmit the subsequent mobile-originated uplink data, which conserves networking, processing, and/or memory resources of the UE 120, the base station(s) 110, and/or the like. Moreover, this permits the UE 120 to receive the mobile-terminated downlink data and/or transmit the subsequent mobile-originated uplink data without establishing a connection (e.g., an RRC connection) with the base station(s) 110, which decreases latency in receiving the mobile-terminated downlink data and/or transmitting the subsequent mobile-originated uplink data. In addition, this reduces a quantity of transitions from the inactive mode to the connected mode to receive small amounts of mobile-terminated downlink data and/or transmit small amounts of mobile-originated uplink data that are generated in bursts, which may save power of the UE 120 and/or the like.

As indicated above, FIG. 5 is provided as an example. Other examples may differ from what is described with respect to FIG. 5.

Figure 6:
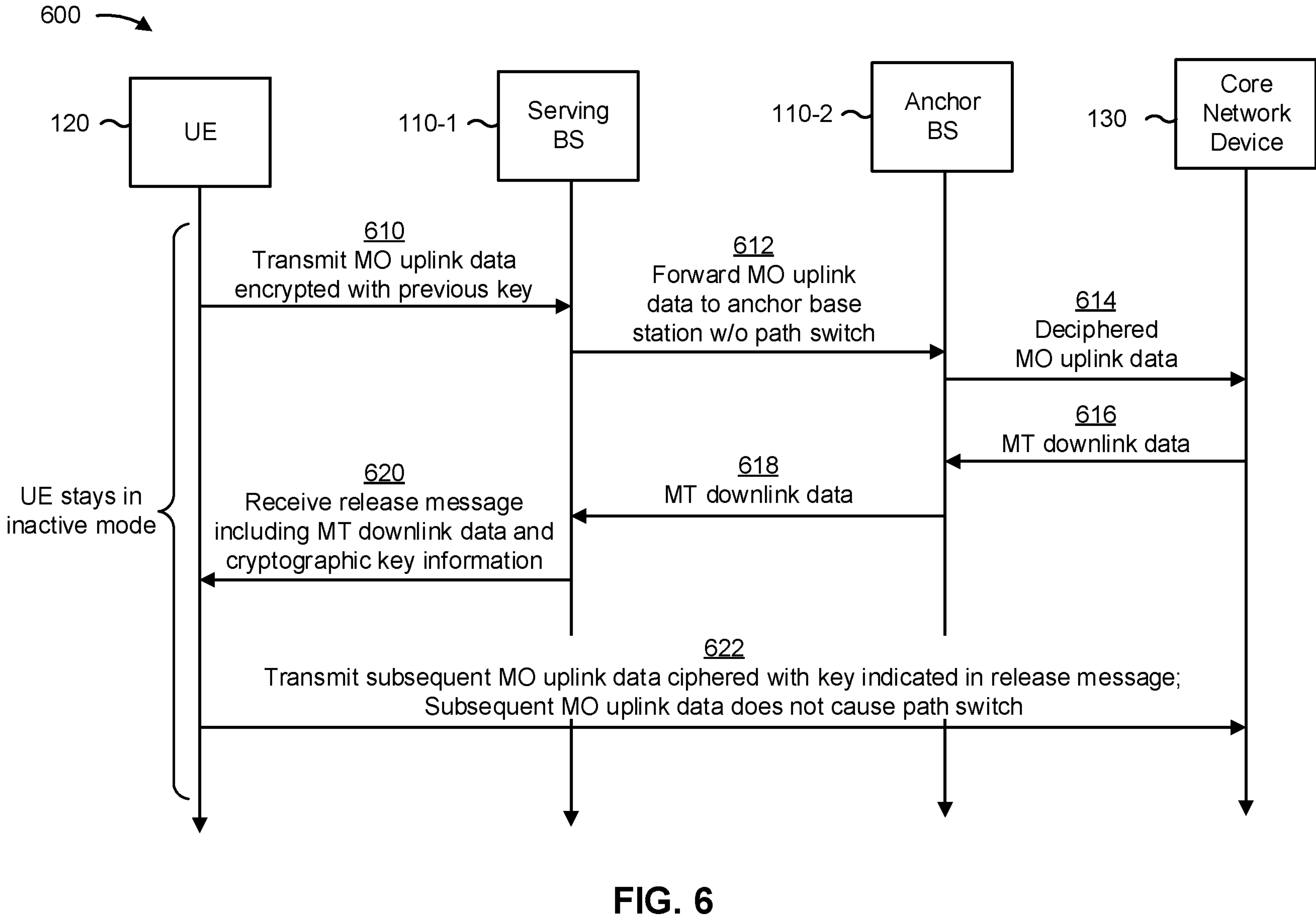

FIG. 6 is a diagram illustrating an example call flow 600 enabling mobile-terminated downlink data transmission and subsequent mobile-originated uplink data transmission without entering connected mode, in accordance with various aspects of the present disclosure. As shown in FIG. 6, example call flow 600 may include communication between various components of a wireless network (e.g., wireless network 100), such as a UE 120, a serving base station 110-1, an anchor base station 110-2, and one or more core network devices 130 (e.g., a network controller or another suitable device implementing a UPF), and/or the like. In some aspects, as shown in FIG. 6, the UE 120 may be operating in an inactive mode. Furthermore, as described herein, the call flow 600 shown in FIG. 6 may enable the UE 120 to transmit initial mobile-originated uplink data and subsequent mobile-originated uplink data that is routed to a core network (e.g., via the core network device(s) 130) without causing a path switch.

As shown in FIG. 6, and by reference number 610, the UE 120 may transmit initial mobile-originated uplink data encrypted with a previous key. In some aspects, the previous key may correspond to a cryptographic key from a previous connection at a time when the UE 120 was released to the inactive mode. For example, in some aspects, as mentioned elsewhere herein, the anchor base station 110-2 may correspond to a base station to which the UE 120 was most recently communicatively connected prior to entering the inactive mode, whereby the previous key may correspond to a cryptographic key in use during a previous connection between the UE 120 and the anchor base station 110-2 when the UE 120 was released to the inactive mode.

As further shown in FIG. 6, and by reference number 612, the mobile-originated uplink data encrypted with the previous key may be received at the serving base station 110-1, which forwards the encrypted mobile-originated uplink data to the anchor base station 110-2 via an Xn interface or another suitable backhaul interface without requesting or otherwise causing a path switch. As further shown in FIG. 6, and by reference number 614, the anchor base station 110-2 may decipher the mobile-originated uplink data using the key from the previous connection with the UE 120 and route the deciphered mobile-originated uplink data to the core network device 130. As further shown in FIG. 6, and by reference numbers 616 and 618, the core network device 130 may return, to the serving base station 110-1, mobile-terminated downlink data responsive to the mobile-originated uplink data via the anchor base station 110-2.

As further shown in FIG. 6, and by reference number 620, the serving base station 110 may transmit, and the UE 120 may receive, a release message that includes the mobile-terminated downlink data (if any) and information related to a cryptographic key to be used for a subsequent mobile-originated uplink data transmission. For example, in some aspects, the anchor base station 110-2 may provide the information related to the cryptographic key to be used for the subsequent mobile-originated uplink data transmission to the serving base station 110-1 (e.g., in a NextHopChainingCount (NCC) parameter), and the serving base station 110-1 may indicate the cryptographic key to be used for the subsequent mobile-originated uplink data transmission to the UE 120. Accordingly, as further shown in FIG. 6, and by reference number 622, the UE 120 may transmit subsequent mobile-originated uplink data that is ciphered or otherwise encrypted using the cryptographic key indicated in the release message, and the subsequent mobile-originated uplink data may be routed to the core network device 130 through the anchor base station 110-2 without causing a path switch in a similar manner as described above. In this way, by avoiding a path switch based at least in part on the UE 120 changing from a coverage area of the anchor base station 110-2 to a coverage area after transitioning to the inactive mode, signaling overhead is reduced, network resources are conserved, and/or the like.

As indicated above, FIG. 6 is provided as an example. Other examples may differ from what is described with respect to FIG. 6.

Figure 7:
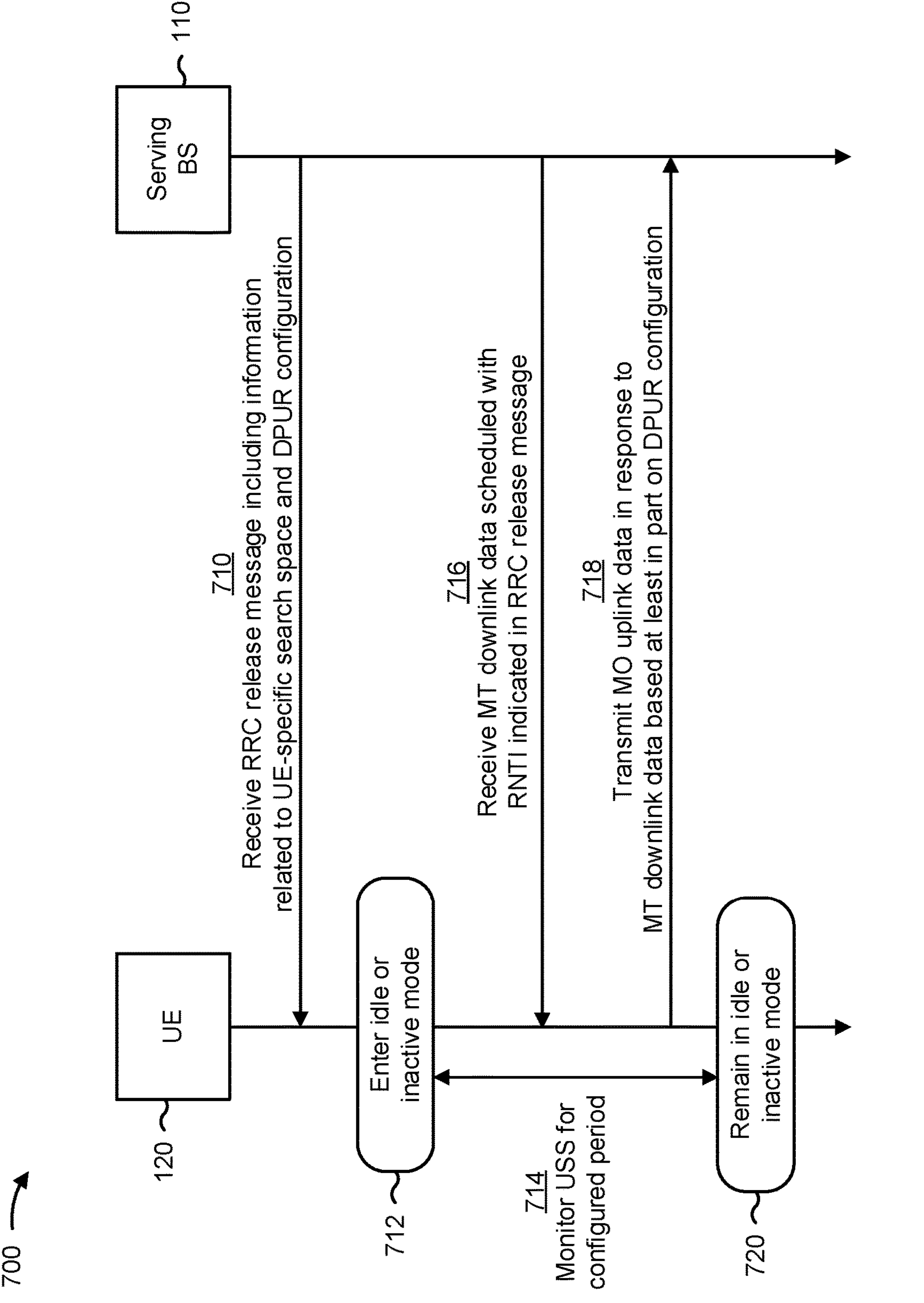

FIG. 7 is a diagram illustrating an example call flow 700 enabling mobile-terminated downlink data transmission and subsequent mobile-originated uplink data transmission without entering connected mode, in accordance with various aspects of the present disclosure. As shown in FIG. 7, example call flow 700 may include communication between various components of a wireless network (e.g., wireless network 100), such as a UE 120 and a serving base station 110. In some aspects, as shown in FIG. 5, the UE 120 may be operating in an idle or inactive mode. Furthermore, as described herein, the call flow 700 shown in FIG. 7 may be used to schedule mobile-terminated downlink data to the UE 120 and enable the UE 120 to transmit mobile-originated uplink data while the UE 120 is operating in the idle or inactive mode.

As shown in FIG. 7, and by reference number 710, the serving base station 110 may schedule the mobile-terminated downlink data by transmitting, to the UE 120, an RRC release message that includes information related to a UE-specific search space (USS), including information defining the USS, a configured time period that the UE 120 is to monitor the USS for the mobile-terminated downlink data, a dedicated RNTI to which the mobile-terminated downlink data is to be addressed, and/or the like. Furthermore, in some aspects, the RRC release message may include information related to a DPUR configuration to enable the UE 120 to transmit the mobile-originated uplink data from the idle or inactive mode (e.g., in response to the mobile-terminated downlink data, independent from the mobile-terminated downlink data, and/or the like). For example, in some aspects, the DPUR configuration may include a dedicated RACH preamble, a dedicated PUSCH, and/or the like, which may be a one-time resource allocation, a periodic resource allocation with a defined validity period, and/or the like.

As shown in FIG. 7, and by reference number 712, the UE 120 may enter the idle mode or the inactive mode based at least in part on the RRC release message received from the serving base station 110. As further shown in FIG. 7, and by reference number 714, the UE 120 may monitor the USS indicated in the RRC release message for mobile-terminated downlink data according to the configured time period indicated in the RRC release message. For example, in some aspects, the UE 120 may monitor the USS indicated in the RRC release message for mobile-terminated downlink data that is addressed to the dedicated RNTI indicated in the RRC release message. Furthermore, in some aspects, the UE 120 may monitor the USS independent of any mobile-originated uplink data (e.g., where the UE 120 does not have mobile-originated uplink data to transmit).

Accordingly, as shown in FIG. 7, and by reference number 716, the serving base station 110 may transmit, and the UE 120 may receive mobile-terminated downlink data that is transmitted within the USS and the configured time period indicated in the RRC release message. Furthermore, as shown, the mobile-terminated downlink data may be addressed to or otherwise scheduled with the dedicated RNTI indicated in the RRC release message. Furthermore, as shown by reference number 718, the UE 120 may transmit mobile-originated uplink data in response to the mobile-terminated downlink data based at least in part on the DPUR configuration indicated in the RRC release message (e.g., via a dedicated PUSCH or another suitable uplink resource). In this way, as shown by reference number 720, the UE 120 may receive the mobile-terminated downlink data and transmit the mobile-originated uplink data while remaining in the idle mode or the inactive mode. Furthermore, by indicating the USS, the dedicated RNTI, the DPUR, and/or the like in the RRC release message releasing the UE 120 to the idle or inactive mode, the UE 120 may receive the mobile-terminated downlink data and transmit the mobile-originated uplink data without reliance on any paging messages, RACH procedure, and/or the like, which may reduce signaling overhead, conserve resources at the UE 120 and the serving base station 110, and/or the like.

In this way, the UE 120 may receive the mobile-terminated downlink data while in the idle or inactive mode, and without transitioning from the idle or inactive mode to a connected mode. This decreases signaling overhead may otherwise be needed to transmit small amounts of mobile-terminated downlink data to the UE 120 and/or for the UE 120 to transmit the subsequent mobile-originated uplink data, which conserves networking, processing, and/or memory resources of the UE 120, the base station(s) 110, and/or the like. Moreover, this permits the UE 120 to receive the mobile-terminated downlink data and/or transmit the subsequent mobile-originated uplink data without establishing a connection (e.g., an RRC connection) with the base station(s) 110, which decreases latency in receiving the mobile-terminated downlink data and/or transmitting the subsequent mobile-originated uplink data. In addition, this reduces a quantity of transitions from the inactive mode to the connected mode to receive small amounts of mobile-terminated downlink data and/or transmit small amounts of mobile-originated uplink data that are generated in bursts, which may save power of the UE 120 and/or the like. Furthermore, by scheduling the mobile-terminated downlink data and enabling transmission of the subsequent mobile-originated uplink data via the DPUR configuration, the UE 120 may receive and/or transmit small amounts of data from the idle or inactive mode without reliance on any paging messages, RACH procedure, and/or the like, which reduces signaling overhead.

As indicated above, FIG. 7 is provided as an example. Other examples may differ from what is described with respect to FIG. 7.

Figure 8:
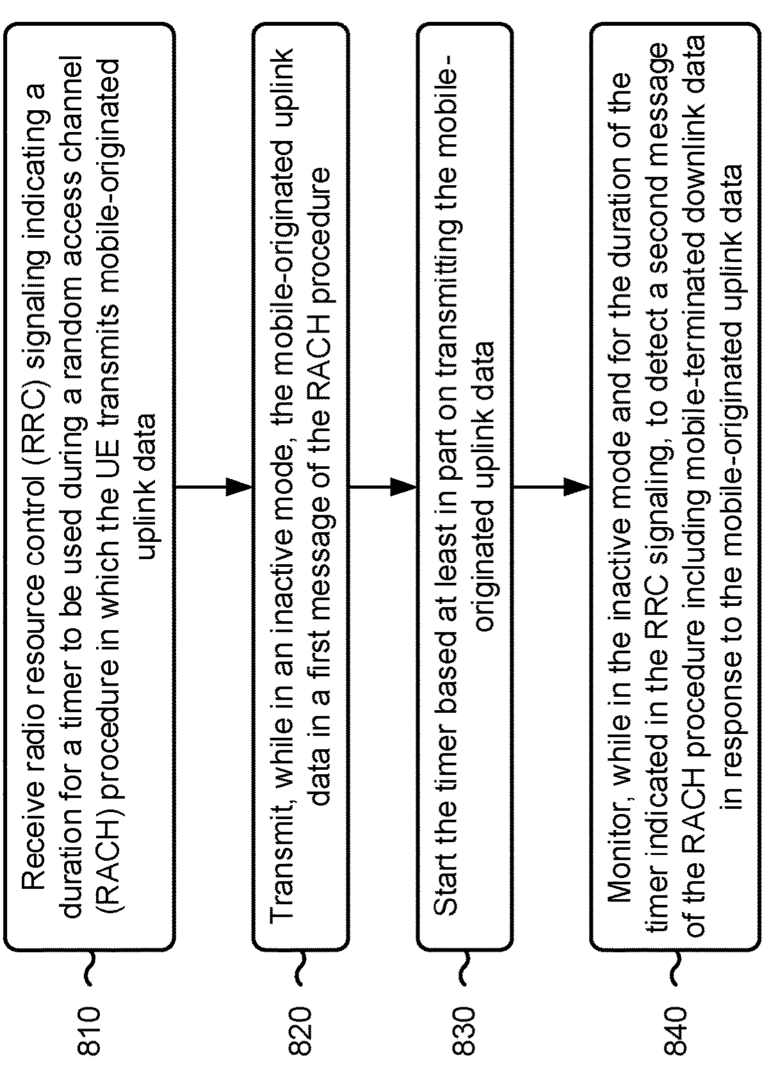
FIGS. 8-10 are diagrams illustrating example processes performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120 and/or the like) performs operations to receive one or more mobile-terminated downlink data transmissions and initiate one or more subsequent mobile-originated uplink data transmissions without entering connected mode.

As shown in FIG. 8, in some aspects, process 800 may include receiving RRC signaling indicating a duration for a timer to be used during a RACH procedure in which the UE transmits mobile-originated uplink data (block 810). For example, the UE (e.g., using antenna 252, DEMOD 254, MIMO detector 256, receive processor 258, controller/processor 280, and/or the like) may receive RRC signaling indicating a duration for a timer to be used during a RACH procedure in which the UE transmits mobile-originated uplink data, as described above.

As further shown in FIG. 8, in some aspects, process 800 may include transmitting, while in an inactive mode, the mobile-originated uplink data in a first message of the RACH procedure (block 820). For example, the UE (e.g., using controller/processor 280, transmit processor 264, TX MIMO processor 266, MOD 254, antenna 252, and/or the like) may transmit, while in an inactive mode, the mobile-originated uplink data in a first message of the RACH procedure, as described above.

As further shown in FIG. 8, in some aspects, process 800 may include starting the timer based at least in part on transmitting the mobile-originated uplink data (block 830). For example, the UE (e.g., using controller/processor 280 and/or the like) may start the timer based at least in part on transmitting the mobile-originated uplink data, as described above.

As further shown in FIG. 8, in some aspects, process 800 may include monitoring, while in the inactive mode and for the duration of the timer indicated in the RRC signaling, to detect a second message of the RACH procedure including mobile-terminated downlink data in response to the mobile-originated uplink data (block 840). For example, the UE (e.g., using antenna 252, DEMOD 254, MIMO detector 256, receive processor 258, controller/processor 280, and/or the like) may monitor, while in the inactive mode and for the duration of the timer indicated in the RRC signaling, to detect a second message of the RACH procedure including mobile-terminated downlink data in response to the mobile-originated uplink data, as described above.

Process 800 may include additional aspects, such as any single aspect or any combination of aspects described below and/or in connection with one or more other processes described elsewhere herein.

In a first aspect, the UE receives the mobile-terminated downlink data in the second message of the RACH procedure prior to expiration of the duration for the timer, and the mobile-terminated downlink data is multiplexed with an RRC release message causing the UE to remain in the inactive mode.

In a second aspect, alone or in combination with the first aspect, the UE transmits subsequent mobile-originated uplink data while in the inactive mode using at least one DPUR allocated to the UE, and information related to the at least one DPUR is indicated in the RRC release message causing the UE to remain in the inactive mode.

In a third aspect, alone or in combination with one or more of the first and second aspects, the at least one DPUR includes one or more of a dedicated RACH preamble or a dedicated PUSCH.

In a fourth aspect, alone or in combination with one or more of the first through third aspects, the mobile-originated uplink data is scrambled using a dedicated RNTI, and the subsequent mobile-originated uplink data is scrambled using the dedicated RNTI.

In a fifth aspect, alone or in combination with one or more of the first through fourth aspects, the UE ciphers the subsequent mobile-originated uplink data prior to transmission using a cryptographic key indicated in the RRC release message, and the mobile-originated uplink data and the subsequent mobile-originated uplink data are delivered to one or more core network devices via an anchor base station without causing a path switch.

In a sixth aspect, alone or in combination with one or more of the first through fifth aspects, the first message and the second message respectively correspond to Message A and Message B in a two-step RACH procedure.

In a seventh aspect, alone or in combination with one or more of the first through sixth aspects, the first message and the second message respectively correspond to Message 3 and Message 4 in a four-step RACH procedure.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
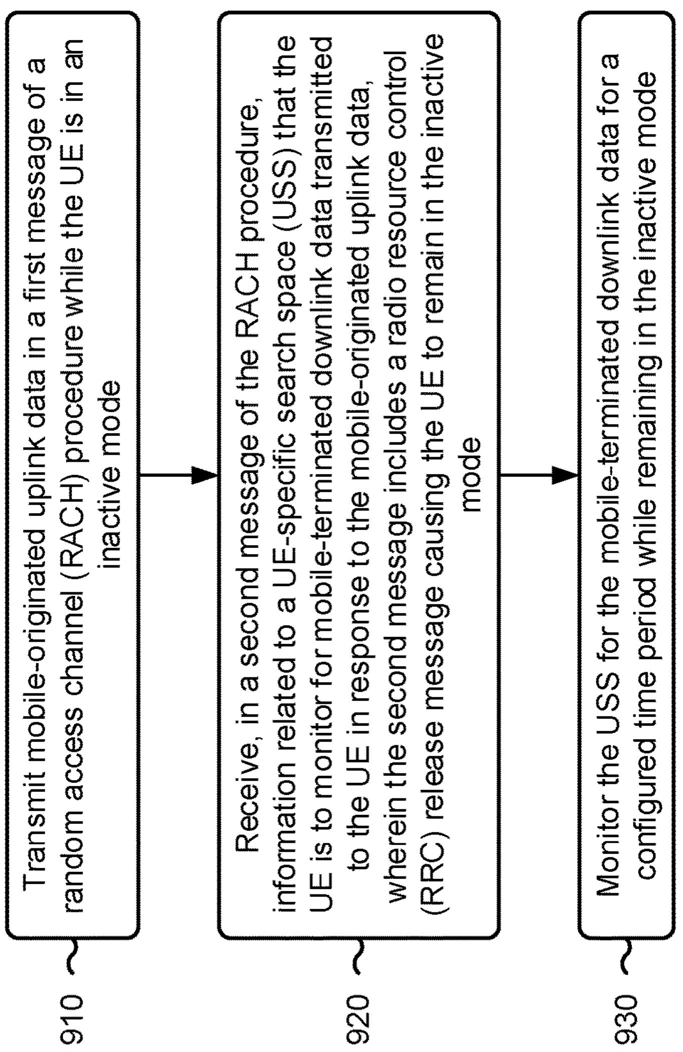

FIG. 9 is a diagram illustrating an example process 900 performed, for example, by a UE, in accordance with various aspects of the present disclosure. Example process 900 is an example where a UE (e.g., UE 120 and/or the like) performs operations to receive one or more mobile-terminated downlink data transmissions and initiate one or more subsequent mobile-originated uplink data transmissions without entering connected mode.

As shown in FIG. 9, in some aspects, process 900 may include transmitting mobile-originated uplink data in a first message of a RACH procedure while the UE is in an inactive mode (block 910). For example, the UE (e.g., using controller/processor 280, transmit processor 264, TX MIMO processor 266, MOD 254, antenna 252, and/or the like) may transmit mobile-originated uplink data in a first message of a RACH procedure while the UE is in an inactive mode, as described above.

As further shown in FIG. 9, in some aspects, process 900 may include receiving, in a second message of the RACH procedure, information related to a USS that the UE is to monitor for mobile-terminated downlink data transmitted to the UE in response to the mobile-originated uplink data, wherein the second message includes an RRC release message causing the UE to remain in the inactive mode (block 920). For example, the UE (e.g., using antenna 252, DEMOD 254, MIMO detector 256, receive processor 258, controller/processor 280, and/or the like) may receive, in a second message of the RACH procedure, information related to a USS that the UE is to monitor for mobile-terminated downlink data transmitted to the UE in response to the mobile-originated uplink data, as described above. In some aspects, the second message includes an RRC release message causing the UE to remain in the inactive mode.

As further shown in FIG. 9, in some aspects, process 900 may include monitoring the USS for the mobile-terminated downlink data for a configured time period while remaining in the inactive mode (block 930). For example, the UE (e.g., using antenna 252, DEMOD 254, MIMO detector 256, receive processor 258, controller/processor 280, and/or the like) may monitor the USS for the mobile-terminated downlink data for a configured time period while remaining in the inactive mode, as described above.

Process 900 may include additional aspects, such as any single aspect or any combination of aspects described below and/or in connection with one or more other processes described elsewhere herein.

In a first aspect, the UE receives the mobile-terminated downlink data in an application layer message acknowledging successful transmission of the mobile-originated uplink data prior to expiration of the configured time period.

In a second aspect, alone or in combination with the first aspect, the first message includes a traffic pattern indication that the UE is to remain in the inactive mode and refrain from entering a connected mode.

In a third aspect, alone or in combination with one or more of the first and second aspects, the UE transmits subsequent mobile-originated uplink data while in the inactive mode using at least one DPUR allocated to the UE, and information related to the at least one DPUR is indicated in the RRC release message causing the UE to remain in the inactive mode.

In a fourth aspect, alone or in combination with one or more of the first through third aspects, the at least one DPUR includes one or more of a dedicated RACH preamble or a dedicated PUSCH.

In a fifth aspect, alone or in combination with one or more of the first through fourth aspects, the mobile-originated uplink data is scrambled using a dedicated RNTI, and the subsequent mobile-originated uplink data is scrambled using the dedicated RNTI.

In a sixth aspect, alone or in combination with one or more of the first through fifth aspects, the UE ciphers the subsequent mobile-originated uplink data prior to transmission using a cryptographic key indicated in the RRC release message, and the mobile-originated uplink data and the subsequent mobile-originated uplink data are delivered to one or more core network devices via an anchor base station without causing a path switch.

In a seventh aspect, alone or in combination with one or more of the first through sixth aspects, the first message and the second message respectively correspond to Message A and Message B in a two-step RACH procedure.

In an eighth aspect, alone or in combination with one or more of the first through seventh aspects, the first message and the second message respectively correspond to Message 3 and Message 4 in a four-step RACH procedure.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
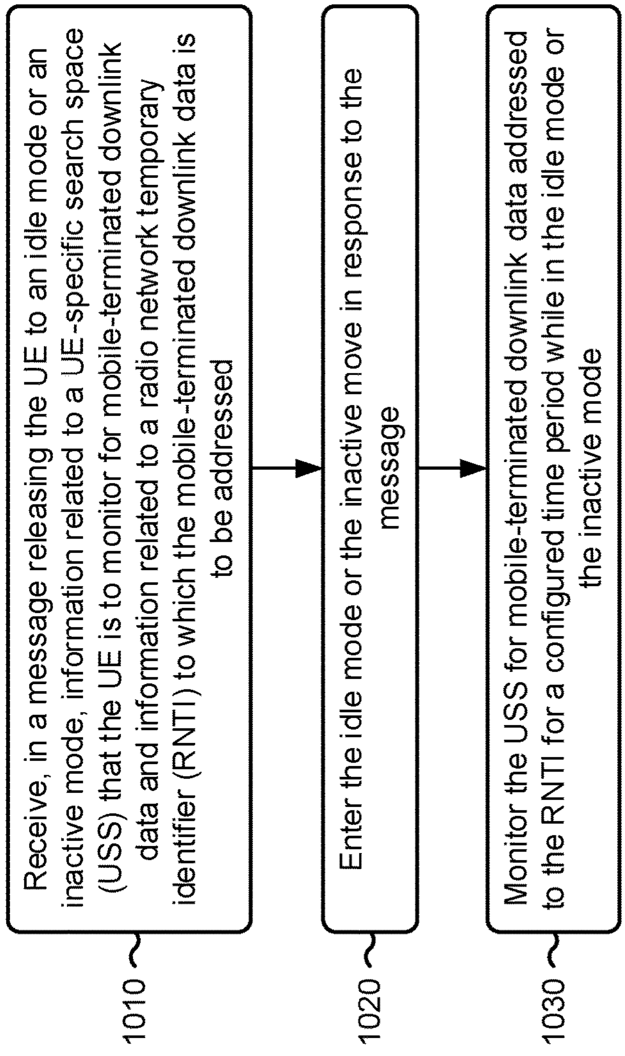

FIG. 10 is a diagram illustrating an example process 1000 performed, for example, by a UE, in accordance with various aspects of the present disclosure. Example process 1000 is an example where a UE (e.g., UE 120 and/or the like) performs operations to receive one or more mobile-terminated downlink data transmissions and initiate one or more subsequent mobile-originated uplink data transmissions without entering connected mode.

As shown in FIG. 10, in some aspects, process 1000 may include receiving, in a message releasing the UE to an idle mode or an inactive mode, information related to a USS that the UE is to monitor for mobile-terminated downlink data and information related to an RNTI to which the mobile-terminated downlink data is to be addressed (block 1010). For example, the UE (e.g., using antenna 252, DEMOD 254, MIMO detector 256, receive processor 258, controller/processor 280, and/or the like) may receive, in a message releasing the UE to an idle mode or an inactive mode, information related to a USS that the UE is to monitor for mobile-terminated downlink data and information related to an RNTI to which the mobile-terminated downlink data is to be addressed, as described above.

As further shown in FIG. 10, in some aspects, process 1000 may include entering the idle mode or the inactive mode in response to the message (block 1020). For example, the UE (e.g., using controller/processor 280 and/or the like) may enter the idle mode or the inactive mode in response to the message, as described above.

As further shown in FIG. 10, in some aspects, process 1000 may include monitoring the USS for mobile-terminated downlink data addressed to the RNTI for a configured time period while in the idle mode or the inactive mode (block 1030). For example, the UE (e.g., using antenna 252, DEMOD 254, MIMO detector 256, receive processor 258, controller/processor 280, and/or the like) may monitor the USS for mobile-terminated downlink data addressed to the RNTI for a configured time period while in the idle mode or the inactive mode, as described above.

Process 1000 may include additional aspects, such as any single aspect or any combination of aspects described below and/or in connection with one or more other processes described elsewhere herein.

In a first aspect, information related to the at least one DPUR is indicated in the message releasing the UE to the idle mode or the inactive mode.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
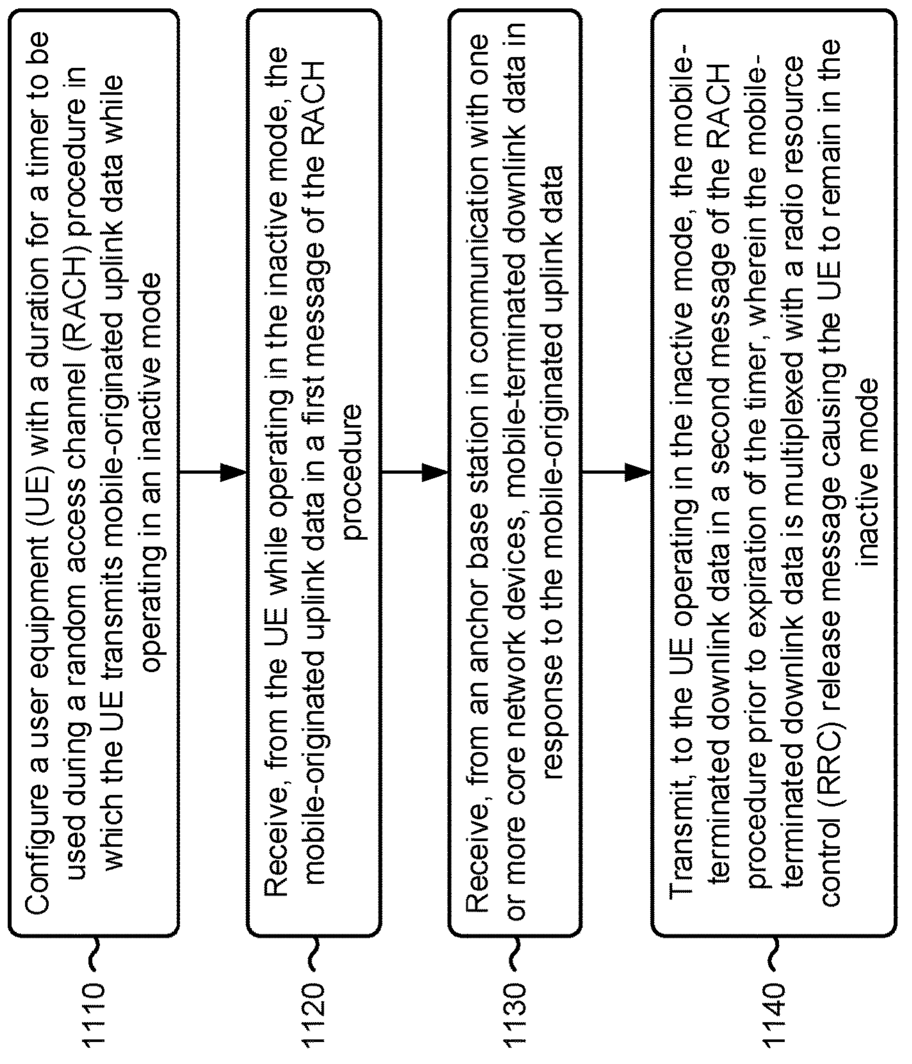
FIGS. 11-13 are diagrams illustrating example processes performed, for example, by a base station, in accordance with various aspects of the present disclosure.

FIG. 11 is a diagram illustrating an example process 1100 performed, for example, by a base station, in accordance with various aspects of the present disclosure. Example process 1100 is an example where a base station (e.g., base station 110 and/or the like) performs operations associated with mobile-terminated downlink data transmission and subsequent mobile-originated uplink data transmission without entering connected mode.

As shown in FIG. 11, in some aspects, process 1100 may include configuring a UE with a duration for a timer to be used during a RACH procedure in which the UE transmits mobile-originated uplink data while operating in an inactive mode (block 1110). For example, the base station (e.g., using controller/processor 240, transmit processor 220, TX MIMO processor 230, MOD 232, antenna 234, and/or the like) may configure a UE with a duration for a timer to be used during a RACH procedure in which the UE transmits mobile-originated uplink data while operating in an inactive mode, as described above.

As further shown in FIG. 11, in some aspects, process 1100 may include receiving, from the UE while operating in the inactive mode, the mobile-originated uplink data in a first message of a RACH procedure (block 1120). For example, the base station (e.g., using antenna 234, DEMOD 232, MIMO detector 236, receive processor 238, controller/processor 240, and/or the like) may receive, from the UE while operating in the inactive mode, the mobile-originated uplink data in a first message of a RACH procedure, as described above.

As further shown in FIG. 11, in some aspects, process 1100 may include receiving, from an anchor base station in communication with one or more core network devices, mobile-terminated downlink data in response to the mobile-originated uplink data (block 1130). For example, the base station (e.g., using antenna 234, DEMOD 232, MIMO detector 236, receive processor 238, controller/processor 240, and/or the like) may receive, from an anchor base station in communication with one or more core network devices, mobile-terminated downlink data in response to the mobile-originated uplink data, as described above.

As further shown in FIG. 11, in some aspects, process 1100 may include transmitting, to the UE operating in the inactive mode, the mobile-terminated downlink data in a second message of the RACH procedure prior to expiration of the timer, wherein the mobile-terminated downlink data is multiplexed with an RRC release message causing the UE to remain in the inactive mode (block 1140). For example, the base station (e.g., using controller/processor 240, transmit processor 220, TX MIMO processor 230, MOD 232, antenna 234, and/or the like) may transmit, to the UE operating in the inactive mode, the mobile-terminated downlink data in a second message of the RACH procedure prior to expiration of the timer, as described above. In some aspects, the mobile-terminated downlink data is multiplexed with an RRC release message causing the UE to remain in the inactive mode.

Process 1100 may include additional aspects, such as any single aspect or any combination of aspects described below and/or in connection with one or more other processes described elsewhere herein.

In a first aspect, the RRC release message indicates at least one DPUR allocated to the UE.

In a second aspect, alone or in combination with the first aspect, the base station receives, while the UE is in the inactive mode, subsequent mobile-originated uplink data from the UE over the at least one DPUR allocated to the UE.

In a third aspect, alone or in combination with one or more of the first and second aspects, the at least one DPUR includes one or more of a dedicated RACH preamble or a dedicated PUSCH.

In a fourth aspect, alone or in combination with one or more of the first through third aspects, the mobile-originated uplink data is scrambled using a dedicated RNTI, and the subsequent mobile-originated uplink data is scrambled using the dedicated RNTI.

In a fifth aspect, alone or in combination with one or more of the first through fourth aspects, the base station deciphers the subsequent mobile-originated uplink data using a cryptographic key indicated to the UE in the RRC release message, and the mobile-originated uplink data and the subsequent mobile-originated uplink data are delivered to the one or more core network devices via the anchor base station without causing a path switch.

In a sixth aspect, alone or in combination with one or more of the first through fifth aspects, the first message and the second message respectively correspond to Message A and Message B in a two-step RACH procedure.

In a seventh aspect, alone or in combination with one or more of the first through sixth aspects, the first message and the second message respectively correspond to Message 3 and Message 4 in a four-step RACH procedure.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
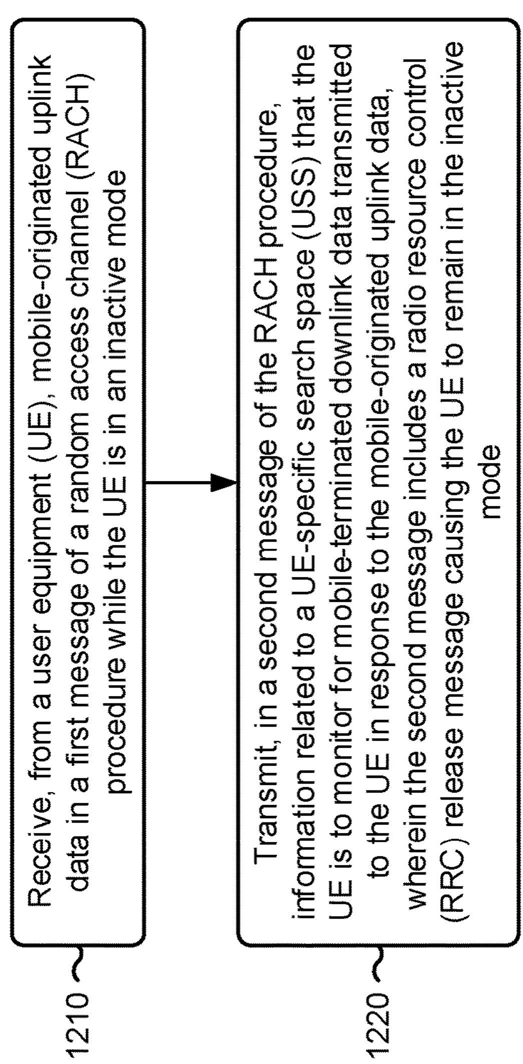

FIG. 12 is a diagram illustrating an example process 1200 performed, for example, by a base station, in accordance with various aspects of the present disclosure. Example process 1200 is an example where a base station (e.g., base station 110 and/or the like) performs operations associated with mobile-terminated downlink data transmission and subsequent mobile-originated uplink data transmission without entering connected mode.

As shown in FIG. 12, in some aspects, process 1200 may include receiving, from a UE, mobile-originated uplink data in a first message of a RACH procedure while the UE is in an inactive mode (block 1210). For example, the base station (e.g., using antenna 234, DEMOD 232, MIMO detector 236, receive processor 238, controller/processor 240, and/or the like) may receive, from a UE, mobile-originated uplink data in a first message of a RACH procedure while the UE is in an inactive mode, as described above.

As further shown in FIG. 12, in some aspects, process 1200 may include transmitting, in a second message of the RACH procedure, information related to a USS that the UE is to monitor for mobile-terminated downlink data transmitted to the UE in response to the mobile-originated uplink data, wherein the second message includes an RRC release message causing the UE to remain in the inactive mode (block 1220). For example, the base station (e.g., using controller/processor 240, transmit processor 220, TX MIMO processor 230, MOD 232, antenna 234, and/or the like) may transmit, in a second message of the RACH procedure, information related to a USS that the UE is to monitor for mobile-terminated downlink data transmitted to the UE in response to the mobile-originated uplink data, as described above. In some aspects, the second message includes an RRC release message causing the UE to remain in the inactive mode.

Process 1200 may include additional aspects, such as any single aspect or any combination of aspects described below and/or in connection with one or more other processes described elsewhere herein.

In a first aspect, the base station receives, from an anchor base station in communication with one or more core network devices, the mobile-terminated downlink data in response to the mobile-originated uplink data, and the base station transmits the mobile-terminated downlink data to the UE in an application layer message acknowledging successful transmission of the mobile-originated uplink data prior to expiration of a configured time period.

In a second aspect, alone or in combination with the first aspect, the first message includes a traffic pattern indication that the UE is to remain in the inactive mode and refrain from entering a connected mode.

In a third aspect, alone or in combination with one or more of the first and second aspects, the base station receives, from the UE, subsequent mobile-originated uplink data while the UE is in the inactive mode, and the subsequent mobile-originated uplink data is received over at least one DPUR that is allocated to the UE and indicated to the UE in the RRC release message causing the UE to remain in the inactive mode.

In a fourth aspect, alone or in combination with one or more of the first through third aspects, the at least one DPUR includes one or more of a dedicated RACH preamble or a dedicated PUSCH.

In a fifth aspect, alone or in combination with one or more of the first through fourth aspects, the mobile-originated uplink data is scrambled using a dedicated RNTI, and the subsequent mobile-originated uplink data is scrambled using the dedicated RNTI.

In a sixth aspect, alone or in combination with one or more of the first through fifth aspects, the base station deciphers the subsequent mobile-originated uplink data using a cryptographic key indicated to the UE in the RRC release message, and the mobile-originated uplink data and the subsequent mobile-originated uplink data are delivered to the one or more core network devices via the anchor base station without causing a path switch.

In a seventh aspect, alone or in combination with one or more of the first through sixth aspects, the first message and the second message respectively correspond to Message A and Message B in a two-step RACH procedure.

In an eighth aspect, alone or in combination with one or more of the first through seventh aspects, the first message and the second message respectively correspond to Message 3 and Message 4 in a four-step RACH procedure.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
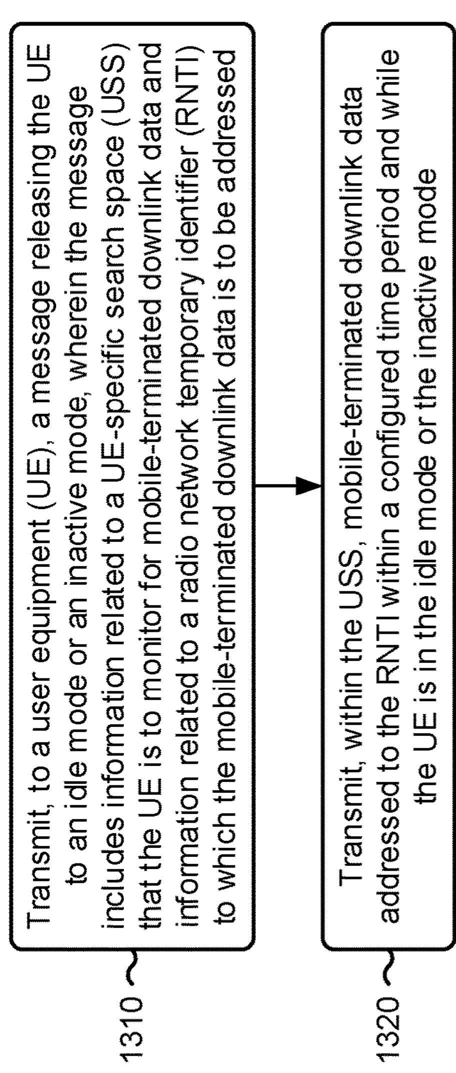
Figure 13:

FIG. 13 is a diagram illustrating an example process 1300 performed, for example, by a base station, in accordance with various aspects of the present disclosure. Example process 1300 is an example where a base station (e.g., base station 110 and/or the like) performs operations associated with mobile-terminated downlink data transmission and subsequent mobile-originated uplink data transmission without entering connected mode.

As shown in FIG. 13, in some aspects, process 1300 may include transmitting, to a UE, a message releasing the UE to an idle mode or an inactive mode, wherein the message includes information related to a USS that the UE is to monitor for mobile-terminated downlink data and information related to a RNTI to which the mobile-terminated downlink data is to be addressed (block 1310). For example, the base station (e.g., using controller/processor 240, transmit processor 220, TX MIMO processor 230, MOD 232, antenna 234, and/or the like) may transmit, to a UE, a message releasing the UE to an idle mode or an inactive mode, as described above. In some aspects, the message includes information related to a USS that the UE is to monitor for mobile-terminated downlink data and information related to a RNTI to which the mobile-terminated downlink data is to be addressed.

As further shown in FIG. 13, in some aspects, process 1300 may include transmitting, within the USS, mobile-terminated downlink data addressed to the RNTI within a configured time period and while the UE is in the idle mode or the inactive mode (block 1320). For example, the base station (e.g., using controller/processor 240, transmit processor 220, TX MIMO processor 230, MOD 232, antenna 234, and/or the like) may transmit, within the USS, mobile-terminated downlink data addressed to the RNTI within a configured time period and while the UE is in the idle mode or the inactive mode, as described above.

Process 1300 may include additional aspects, such as any single aspect or any combination of aspects described below and/or in connection with one or more other processes described elsewhere herein.

In a first aspect, the message releasing the UE to the idle mode or the inactive mode indicates a DPUR allocated to the UE.

In a second aspect, alone or in combination with the first aspect, the base station receives, from the UE while the UE is in the idle mode or the inactive mode, mobile-originated uplink data over the DPUR indicated in the message releasing the UE to the idle mode or the inactive mode.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

receiving radio resource control (RRC) signaling indicating a duration for a timer to be used during a random access channel (RACH) procedure in which the UE transmits mobile-originated uplink data;

transmitting, while in an inactive mode, a first message of the RACH procedure including the mobile-originated uplink data, the first message corresponding to Message A in a two-step RACH procedure or Message 3 in a four-step RACH procedure;

starting, while in the inactive mode, the timer based at least in part on transmitting the first message; and monitoring, while in the inactive mode and for the duration of the timer indicated in the RRC signaling, to detect a second message of the RACH procedure comprising an RRC release message, wherein the RRC release message includes information related to a UE-specific search space (USS) that the UE is to monitor for mobile-terminated downlink data transmitted in response to the mobile-originated uplink data.

2. The method of claim 1, further comprising transmitting subsequent mobile-originated uplink data while in the inactive mode using at least one dedicated preconfigured uplink resource (DPUR) allocated to the UE, wherein information related to the at least one DPUR is indicated in the RRC release message causing the UE to remain in the inactive mode.

3. The method of claim 2, wherein the at least one DPUR includes one or more of a dedicated RACH preamble or a dedicated physical uplink shared channel.

4. The method of claim 2, wherein the mobile-originated uplink data is scrambled using a dedicated radio network temporary identifier (RNTI) and wherein the subsequent mobile-originated uplink data is scrambled using the dedicated RNTI.

5. The method of claim 2, further comprising ciphering the subsequent mobile-originated uplink data prior to transmission using a cryptographic key indicated in the RRC release message, wherein the mobile-originated uplink data and the subsequent mobile-originated uplink data are delivered to one or more core network devices via an anchor base station without causing a path switch.

6. The method of claim 1, wherein the second message corresponds to Message B in a two-step RACH procedure.

7. The method of claim 1, wherein the second message corresponds to Message 4 in a four-step RACH procedure.

8. A method of wireless communication performed by a user equipment (UE), comprising:

transmitting mobile-originated uplink data in a first message of a random access channel (RACH) procedure while the UE is in an inactive mode;

receiving, while remaining in the inactive mode, a radio resource control (RRC) release message, the RRC release message including information related to a UE-specific search space (USS) that the UE is to monitor for mobile-terminated downlink data transmitted in response to the mobile-originated uplink data; and monitoring the USS for the mobile-terminated downlink data for a configured time period while remaining in the inactive mode.

9. The method of claim 8, further comprising receiving the mobile-terminated downlink data in an application layer message acknowledging successful transmission of the mobile-originated uplink data prior to expiration of the configured time period.

10. The method of claim 8, wherein the first message includes a traffic pattern indication that the UE is to remain in the inactive mode and refrain from entering a connected mode.

11. The method of claim 8, further comprising transmitting subsequent mobile-originated uplink data while in the inactive mode using at least one dedicated preconfigured uplink resource (DPUR) allocated to the UE, wherein information related to the at least one DPUR is indicated in the RRC release message causing the UE to remain in the inactive mode.

12. The method of claim 11, wherein the at least one DPUR includes one or more of a dedicated RACH preamble or a dedicated physical uplink shared channel.

13. The method of claim 11, wherein the mobile-originated uplink data is scrambled using a dedicated radio network temporary identifier (RNTI) and wherein the subsequent mobile-originated uplink data is scrambled using the dedicated RNTI.

14. The method of claim 11, further comprising ciphering the subsequent mobile-originated uplink data prior to transmission using a cryptographic key indicated in the RRC release message, wherein the mobile-originated uplink data and the subsequent mobile-originated uplink data are delivered to one or more core network devices via an anchor base station without causing a path switch.

15. The method of claim 8, wherein the first message corresponds to Message A in a two-step RACH procedure.

16. The method of claim 8, wherein the first message corresponds to Message 3 in a four-step RACH procedure.

17. A method of wireless communication performed by a base station, comprising:

configuring a user equipment (UE) with a duration for a timer to be used during a random access channel (RACH) procedure, wherein the duration comprises an extended duration for a T319 timer;

receiving, from the UE, a first message of the RACH procedure including mobile-originated uplink data, the first message corresponding to Message A in a two-step RACH procedure or Message 3 in a four-step RACH procedure;

receiving, from an anchor base station in communication with one or more core network devices, mobile-terminated downlink data in response to the mobile-originated uplink data; and transmitting, to the UE, the mobile-terminated downlink data in a second message of the RACH procedure prior to expiration of the timer, wherein the second message includes information related to a UE-specific search space (USS) that the UE is to monitor for mobile-terminated downlink data transmitted in response to the mobile-originated uplink data.

18. The method of claim 17, wherein the second message indicates at least one dedicated preconfigured uplink resource (DPUR) allocated to the UE.

19. The method of claim 18, further comprising receiving, while the UE is in an inactive mode, subsequent mobile-originated uplink data from the UE over the at least one DPUR allocated to the UE.

20. The method of claim 19, wherein the mobile-originated uplink data is scrambled using a dedicated radio network temporary identifier (RNTI) and wherein the subsequent mobile-originated uplink data is scrambled using the dedicated RNTI.

21. The method of claim 19, further comprising deciphering the subsequent mobile-originated uplink data using a cryptographic key indicated to the UE in the second message, wherein the mobile-originated uplink data and the subsequent mobile-originated uplink data are delivered to the one or more core network devices via the anchor base station without causing a path switch.

22. The method of claim 17, wherein the first message and the second message respectively correspond to Message A and Message B in a two-step RACH procedure.

23. The method of claim 17, wherein the first message and the second message respectively correspond to Message 3 and Message 4 in a four-step RACH procedure.

24. The method of claim 17, wherein the RACH procedure is a contention-based RACH procedure.

25. An apparatus for wireless communication at a user equipment (UE), comprising:

one or more memories storing processor-executable code; and one or more processors coupled with the one or more memories and individually or collectively operable to cause the UE to:

transmit mobile-originated uplink data in a first message of a random access channel (RACH) procedure while the UE is in an inactive mode;

receive, while remaining in the inactive mode, a radio resource control (RRC) release message, the RRC release message including information related to a UE-specific search space (USS) that the UE is to monitor for mobile-terminated downlink data transmitted in response to the mobile-originated uplink data; and monitor the USS for the mobile-terminated downlink data for a configured time period while remaining in the inactive mode.

26. The apparatus of claim 25, wherein the one or more processors are, individually or collectively, operable to cause the UE to:

receive the mobile-terminated downlink data in an application layer message acknowledging successful transmission of the mobile-originated uplink data prior to expiration of a configured time period.

27. The apparatus of claim 25, wherein the first message includes a traffic pattern indication that the UE is to remain in an inactive mode and refrain from entering a connected mode.

28. The apparatus of claim 25, wherein the one or more processors are, individually or collectively, operable to cause the UE to:

transmit, while in the inactive mode, subsequent mobile-originated uplink data using at least one dedicated preconfigured uplink resource (DPUR) allocated to the UE and indicated to the UE in the RRC release message causing the UE to remain in the inactive mode.

29. An apparatus for wireless communication at a user equipment (UE), comprising:

one or more memories storing processor-executable code; and one or more processors coupled with the one or more memories and individually or collectively operable to cause the UE to:

receive radio resource control (RRC) signaling indicating a duration for a timer to be used during a random access channel (RACH) procedure in which the UE transmits mobile-originated uplink data;

transmit, while in an inactive mode, a first message of the RACH procedure including the mobile-originated uplink data, the first message corresponding to Message A in a two-step RACH procedure or Message 3 in a four-step RACH procedure;

start, while in the inactive mode, the timer based at least in part on transmitting the first message; and monitor, while in the inactive mode and for the duration of the timer indicated in the RRC signaling, to detect a second message of the RACH procedure comprising an RRC release message, wherein the RRC release message includes information related to a UE-specific search space (USS) that the UE is to monitor for mobile-terminated downlink data transmitted in response to the mobile-originated uplink data.

30. The apparatus of claim 29, wherein the one or more processors are, individually or collectively, operable to cause the UE to:

transmit subsequent mobile-originated uplink data while in the inactive mode using at least one dedicated preconfigured uplink resource (DPUR) allocated to the UE, wherein information related to the at least one DPUR is indicated in the RRC release message causing the UE to remain in the inactive mode.

* * * * *